(12) United States Patent
Ochiai et al.

(10) Patent No.: US 7,723,636 B2
(45) Date of Patent: May 25, 2010

(54) METHOD FOR REPAIRING MACHINE PART, METHOD FOR FORMING RESTORED MACHINE PART, METHOD FOR MANUFACTURING MACHINE PART, GAS TURBINE ENGINE, ELECTRIC DISCHARGE MACHINE, METHOD FOR REPAIRING TURBINE COMPONENT, AND METHOD FOR FORMING RESTORED TURBINE COMPONENT

(75) Inventors: Hiroyuki Ochiai, Tokyo (JP); Mitsutoshi Watanabe, Tokyo (JP); Tatsuto Urabe, Tokyo (JP); Kazuo Souno, Tokyo (JP); Akihiro Goto, Tokyo (JP); Masao Akiyoshi, Tokyo (JP)

(73) Assignees: Ishikawajima-Harima Heavy Industries Co., Ltd., Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 833 days.

(21) Appl. No.: 10/560,353

(22) PCT Filed: Jun. 11, 2004

(86) PCT No.: PCT/JP2004/008213

§ 371 (c)(1),
(2), (4) Date: May 26, 2006

(87) PCT Pub. No.: WO2004/111304

PCT Pub. Date: Dec. 23, 2004

(65) Prior Publication Data

US 2006/0240184 A1    Oct. 26, 2006

(30) Foreign Application Priority Data

Jun. 11, 2003  (JP) .............................. 2003-167073
Jun. 11, 2003  (JP) .............................. 2003-167074
Jun. 11, 2003  (JP) .............................. 2003-167076

(51) Int. Cl.
*B23H 1/00*    (2006.01)
*B05D 3/14*    (2006.01)
*B23P 6/04*    (2006.01)
*F01D 5/28*    (2006.01)

(52) U.S. Cl. .................. 219/69.17; 29/889.1; 427/142; 427/580; 416/241 R

(58) Field of Classification Search ................ 29/889.1; 219/69.17; 427/140, 142, 580
See application file for complete search history.

(56) References Cited

U.S. PATENT DOCUMENTS 3,041,442 A * 6/1962 Ullmann et al. .......... 219/69.15
(Continued)

FOREIGN PATENT DOCUMENTS

CN    1272144 A    1/2000
(Continued)

OTHER PUBLICATIONS

Ekmekci et al., Metallurgical Properties of Electric Discharge Machined Surfaces, Jul. 2002, Proceedings of ESDA2002, pp. 1-7.*

(Continued)

*Primary Examiner*—Geoffrey S Evans
(74) *Attorney, Agent, or Firm*—Oblon, Spivak, McClelland, Maier & Neustadt, L.L.P.

(57) ABSTRACT

A defect generated at a portion to be treated of a machine component is removed, a porous deposition is formed by employing a molded electrode composed of a molded body or such molded from powder of a metal or such and generating a pulsing electric discharge between a removed portion from which the defect in the machine component is removed and the molded electrode so that a material of the molded electrode or such is deposited or so at the removed portion of the machine component by energy of the electric discharge and finish machining to required dimension is carried out so as to make a thickness of the deposition to be a predetermined thickness.

20 Claims, 14 Drawing Sheets

U.S. PATENT DOCUMENTS

| | | | |
|---|---|---|---|
| 3,287,537 A | | 11/1966 | Chenel et al. |
| 3,796,852 A | * | 3/1974 | Vlach ...................... 219/69.15 |
| 4,316,071 A | | 2/1982 | Bonga |
| 5,071,054 A | * | 12/1991 | Dzugan et al. ............. 29/889.1 |
| 5,675,892 A | * | 10/1997 | Mannava et al. ........... 29/889.1 |
| 5,698,114 A | * | 12/1997 | Magara et al. ........... 219/69.17 |
| 5,951,884 A | * | 9/1999 | Futamura ................. 219/69.17 |
| 6,417,477 B1 | * | 7/2002 | Brown et al. ............. 219/76.13 |
| 6,532,656 B1 | * | 3/2003 | Wilkins et al. ............. 29/889.1 |
| 6,602,561 B1 | * | 8/2003 | Moro et al. ................. 427/580 |
| 7,537,809 B2 | * | 5/2009 | Ochiai et al. ................ 427/580 |
| 2003/0102287 A1 | | 6/2003 | Katsumata et al. |
| 2007/0160469 A1 | * | 7/2007 | Ochiai et al. ................ 415/200 |

FOREIGN PATENT DOCUMENTS

| | | | |
|---|---|---|---|
| DE | 10005874 A1 | * | 8/2001 |
| EP | 0 140 694 B1 | | 5/1985 |
| EP | 0 527 626 A2 | | 2/1993 |
| EP | 0 920 946 A2 | | 6/1999 |
| EP | 1 092 497 A1 | | 4/2001 |
| EP | 1 287 936 A1 | | 3/2003 |
| JP | 62-15015 A | * | 1/1987 |
| JP | 62-24916 | | 2/1987 |
| JP | 62-161493 | | 7/1987 |
| JP | 63-7234 A | * | 1/1988 |
| JP | 3-2425 | | 1/1991 |
| JP | 4-309452 | | 11/1992 |
| JP | 5-141685 | | 6/1993 |
| JP | 5-148615 | | 6/1993 |
| JP | 6-280044 | | 10/1994 |
| JP | 7-75893 | | 3/1995 |
| JP | 7-187275 | | 7/1995 |
| JP | 7-228979 | | 8/1995 |
| JP | 8-257841 | | 10/1996 |
| JP | 8-290332 A | * | 11/1996 |
| JP | 8-300227 | | 11/1996 |
| JP | 9-19829 A | * | 1/1997 |
| JP | 9-192937 | | 7/1997 |
| JP | 10-225824 | | 8/1998 |
| JP | 11-117705 | | 4/1999 |
| JP | 2000-71126 | | 3/2000 |
| JP | 2000-160361 | | 6/2000 |
| JP | 2000-192256 | | 7/2000 |
| JP | 2000-230996 | | 8/2000 |
| JP | 2002-303155 | | 10/2002 |
| JP | 2003-53533 | | 2/2003 |
| JP | 2004-150272 | | 5/2004 |
| KR | 2003-0037459 A | | 5/2003 |
| WO | 99/58744 | | 11/1999 |
| WO | WO 01/36710 A1 | | 5/2001 |

OTHER PUBLICATIONS

"Repair and Reinforcement of Damage of Gas Turbine Blade Caused by Water Corrosion", Dec. 31, 1996, pp. 33-35 and 39.

Huang Xiao' Ou, et al., "The Electro—Spark Deposition on Damaged Bearing Section of High-Power Generator Rotator", Chinese Academy of Agricultural Machanization Sciences Material & Technology Research Institute, 2000, pp. 26-29.

Hiroji Nagano, et al., "Metal Surface Modification by Electrical Discharge Machining", Surface Modification Technologies VII, Proceedings of the International Conference, Oct. 31-Nov. 2, 1993 (1994), 20 Pages.

Masahiko Suzuki, et al., "Surface Modification by Means of the Electrical Discharge Machining", Semitsu Kogaku Kaishi, vol. 53, No. 2, (1987), pp. 243-249.

* cited by examiner

METHOD FOR REPAIRING MACHINE PART, METHOD FOR FORMING RESTORED MACHINE PART, METHOD FOR MANUFACTURING MACHINE PART, GAS TURBINE ENGINE, ELECTRIC DISCHARGE MACHINE, METHOD FOR REPAIRING TURBINE COMPONENT, AND METHOD FOR FORMING RESTORED TURBINE COMPONENT

TECHNICAL FIELD

The present invention relates to a repair method for a machine component, a production method of a restored machine component, a production method of a machine component, a gas turbine engine, an electric spark machine, a repair method for a turbine component and a production method for a restored turbine component.

BACKGROUND ART

In general, a machine component such as a turbine rotor blade applied to a gas turbine engine will be subject to various repairs until coming to the end of its life. In a case where a defect such as a crack occurs to a portion to be repaired of the turbine rotor blade, the repairs are carried out in accordance with the following manner.

More specifically, the defect generated at the portion to be repaired of the turbine rotor blade is removed by grinding machining. Subsequently, a deposition is formed by cladding by welding at a removed portion from which the defect in the turbine rotor blade is removed. Thereby the turbine rotor blade as the machine component can be repaired and, in other words, a restored turbine rotor blade as a restored machine component can be produced from an original turbine rotor blade as an original machine component which is a subject of repair.

DISCLOSURE OF INVENTION

In the meantime, it is not easy to limit a range of the deposition to the removed portion of the machine component by cladding by welding and hence it is unavoidable to generate an excessive deposition by forming the deposition. Therefore, it is necessary to remove the excessive deposition after forming the deposition and there is a problem that a time required for repairing the portion to be repaired of the machine component, in other words, a time required for production of the restored machine component is elongated.

Meanwhile, the aforementioned problem occurs to production of a newly produced machine component, which includes a step of cladding by welding.

To solve the aforementioned problem, a first feature of the present invention is a repair method of a machine component for repairing a portion to be repaired of an electrically conductive machine component and being provided with a removal step of removing a defect generated at the portion to be repaired of the machine component; and a deposition step of forming a porous deposition after finishing the removal step by employing a molded electrode composed of a molded body molded from a powder of a metal, a mixed powder of a powder of a metal and a powder of a ceramic, or the molded body processed with a heat treatment, and generating a pulsing electric discharge between a removed portion from which the defect in the machine component is removed and the molded electrode in an electrically insulating liquid or gas so that a material of the molded electrode or a reaction substance of the material carries out deposition, diffusion and/or welding at the removed portion of the machine component by energy of the electric discharge.

Moreover, a second feature of the present invention is a production method for production of a restored machine component from an electrically conductive original machine component and being provided with a removal step of removing a defect generated at a portion to be repaired of the original machine component; and a deposition step of forming a porous deposition after finishing the defect removal step by employing a molded electrode composed of a molded body molded from a powder of a metal, a mixed powder of a powder of a metal and a powder of a ceramic, or the molded body processed with a heat treatment, and generating a pulsing electric discharge between a removed portion from which the defect in the original machine component is removed and the molded electrode in an electrically insulating liquid or gas so that a material of the molded electrode or a reaction substance of the material carries out deposition, diffusion and/or welding at the removed portion of the original machine component by energy of the electric discharge.

Furthermore, a third feature of the present invention is a production method for producing a machine component provided with an electrically conductive component main body and a porous deposition formed at a portion to be treated of the component main body and being provided with a main body step of forming from the component main body; and a deposition step of forming the deposition after finishing the main body step by employing a molded electrode composed of a molded body molded from a powder of a metal, a mixed powder of a powder of a metal and a powder of a ceramic, or the molded body processed with a heat treatment, and generating a pulsing electric discharge between the portion to be treated of the component main body and the molded electrode in an electrically insulating liquid or gas so that a material of the molded electrode or a reaction substance of the material carries out deposition, diffusion and/or welding at the portion to be treated of the component main body by energy of the electric discharge.

BRIEF DESCRIPTION OF DRAWINGS

FIG. 4(a), FIG. 4(b), FIG. 4(c) are drawings explaining a repair method of a machine component in accordance with the first embodiment and a production method of a restored machine component in accordance with a second embodiment.

FIG. 5(a), FIG. 5(b), FIG. 5(c) are drawings explaining the repair method of the machine component in accordance with the first embodiment and the production method of the restored machine component in accordance with the second embodiment.

FIG. 9(a), FIG. 9(b), FIG. 9(c) are drawings explaining a production method of a machine component in accordance with the third embodiment.

FIG. 10(a), FIG. 10(b), FIG. 10(c) are drawings explaining the production method of the machine component in accordance with the third embodiment.

FIG. 16(a), FIG. 16(b), FIG. 16(c) are drawings explaining the repair method of the machine component in accordance with the fourth embodiment and the production method of the restored machine component in accordance with the fifth embodiment.

FIG. 17(a) and FIG. 17(b) are drawings explaining the repair method of the machine component in accordance with the fourth embodiment and the production method of the restored machine component in accordance with the fifth embodiment.

BEST MODE FOR CARRYING OUT THE INVENTION

Figure 1:
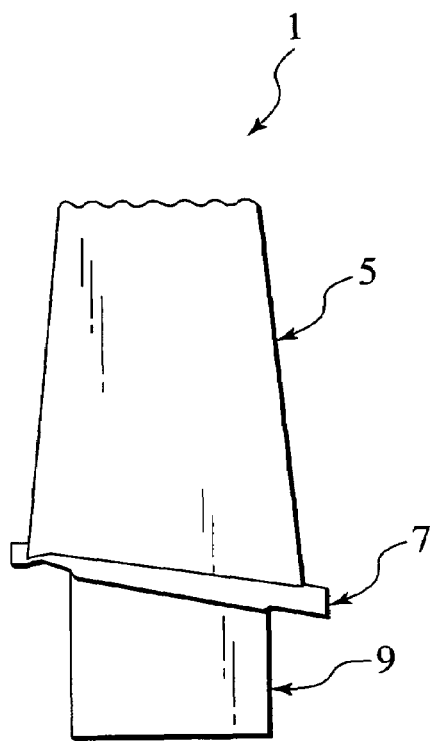
[FIG. 1] A drawing showing a turbine rotor blade in accordance with a first embodiment.

A description will be hereinafter given to certain embodiments of the present invention for describing the present invention in further detail with appropriate reference to the accompanying drawings. Meanwhile, in the drawings, "FF" denotes a forward direction and "FR" denotes a rearward direction. Moreover, in the description, in proper, "a cross direction" is referred to as an X-axis direction, "a horizontal direction" is referred to as a Y-axis direction and "a vertical direction" is referred to as a Z-axis direction. Furthermore, "a discharge direction" denotes a front and back direction with respect to a surface of its form in FIG. 6 and FIG. 11.

First Embodiment

First, a turbine rotor blade 1 which is a subject of a repair method of a machine component in accordance with a first embodiment will be described hereinafter with reference to FIG. 1 and FIG. 2.

The turbine rotor blade 1 is one of electrically conductive machine components and, when being repaired, can be re-used in a gas turbine engine 3 of a jet engine or such.

The turbine rotor blade 1 is provided with a blade 5, a platform 7 formed at a proximal end of the blade 5 and a dovetail 9 formed at the plat form 7. Here, the dovetail 9 is engageable with a dovetail slot (not shown) of a turbine disk (not shown) which is a component element of the gas turbine engine 3.

Meanwhile, a tip end portion of the blade 5 is a portion to be treated of the turbine rotor blade 1.

Figure 3:
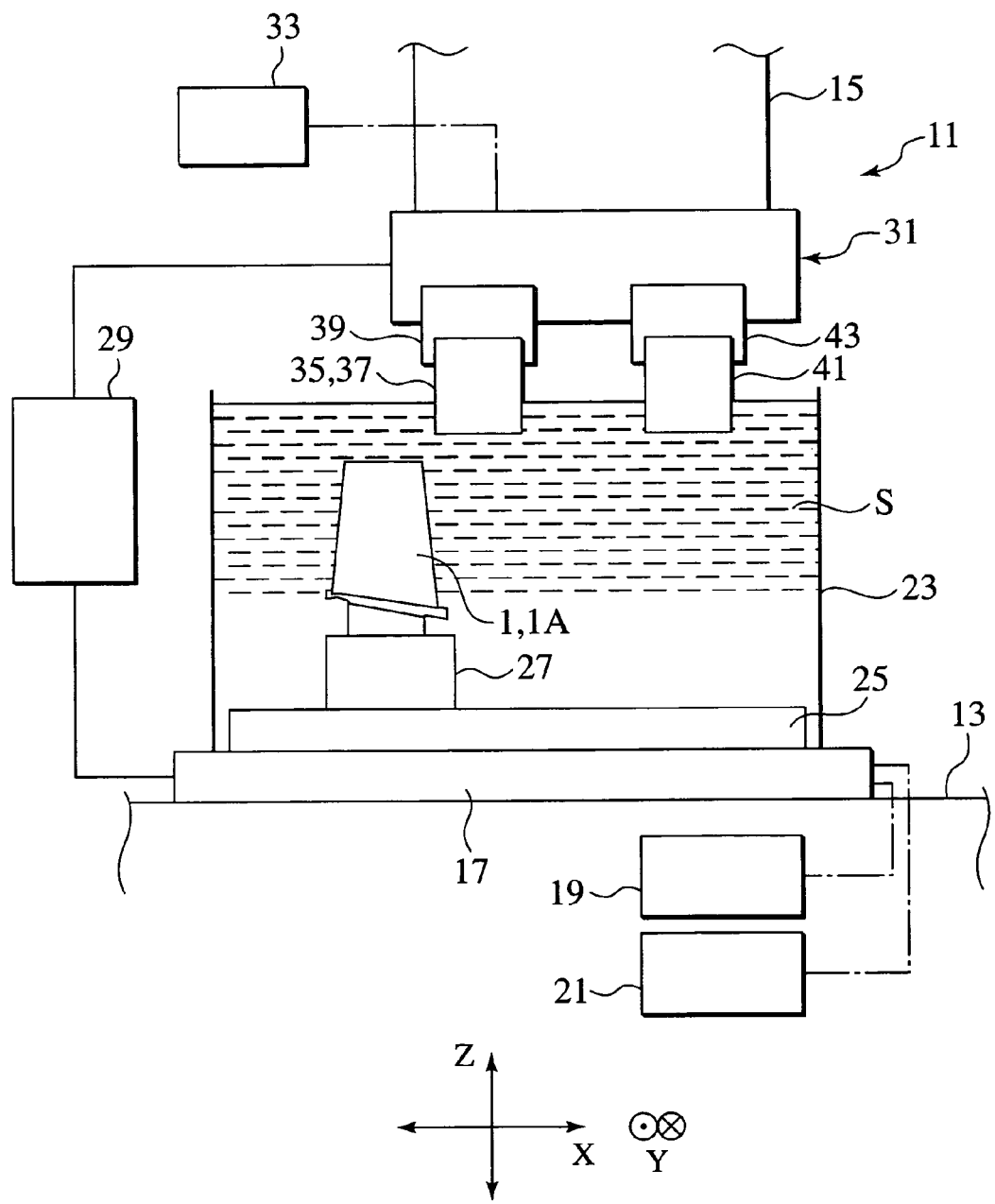
[FIG. 3] A drawing showing an electric spark machine in accordance with a first embodiment.

Next, an electric spark machine 11 employed for a repair method of a machine component in accordance with the first embodiment will be described hereinafter with reference to FIG. 3.

The electric spark machine 11 in accordance with the first embodiment is a machine employed for the repair method of the machine component in accordance with the first embodiment and such and provided with a bed 13 extending in an X-axis direction and a Y-axis direction and a column 15 extending in an Z-axis. Further, the bed 13 is provided with a table 17 and the table 17 is movable in the X-axis direction by means of drive of an X-axis servo-motor 19 and movable in the Y-axis direction by means of drive of a Y-axis servo-motor 21.

The table 17 is provided with a processing tank 23 for reserving an electrically insulating liquid S containing alkane hydrocarbons such as oil and, in the processing tank 23, a support plate 25 is provided. The support plate 25 is provided with a jig 27 to which a machine component such as the turbine rotor blade 1 or a component main body of the machine component described later is capable of being set. Meanwhile, the jig 27 is electrically connected to an electric power source 29.

The column 15 is provided with a processing head 31 and the processing head 31 is movable in a Z-axis direction by means of drive of a Z-axis servo-motor 33. Moreover, the processing head 31 is provided with a first holder 39 for supporting a hard molded electrode 37 and, in the vicinity of the first holder 39 in the processing head 31, a second holder 43 for supporting a hard electrode 41 having exhaustion resistance is provided. The first holder 39 and the second holder 43 are electrically connected to the electric power source 29.

Here, the molded electrode 35 is a molded body molded from powder of an oxidation-resistant metal by means of compression by pressing; or the molded body subject to a heat treatment by a vacuum furnace or such. Meanwhile, instead of molding by compressing, the electrode 35 may be formed by slurry pouring, MIM (Metal Injection Molding), spray forming and such.

Moreover, the oxidation-resistant metal composing the molded electrode 35 includes nickel alloys such as NiCr, CoNiCrAlY and such and cobalt alloys. Meanwhile, the molded electrode 35 may be composed of a molded body compressed and molded from mixed powder of powder of the oxidation-resistant metal and powder of a ceramic.

The hard molded electrode 37 is composed of a molded body molded from mixed powder of an oxidation-resistant metal and powder of a ceramic by means of compression by pressing, or the molded body subject to a heat treatment by a vacuum furnace. Meanwhile, instead of molding by compressing, the hard molded electrode 37 may be formed by slurry pouring, MIM (Metal Injection Molding), spray forming and such.

Moreover, the oxidation-resistant metal composing the hard molded electrode 37 is the same as the oxidation-resistant metal composing the molded electrode 35 and the ceramic composing the hard molded electrode 37 is any one material or a mixed material of any two or more of cBN, TiC, TiN, TiAlN, $TiB_2$, WC, SiC, $Si_3N_4$, $Cr_3C_2$, $Al_2O_3$, $ZrO_2$—Y, ZrC, VC and $B_4C$.

Meanwhile, the hard molded electrode 37 may be composed of a molded body compressed and molded from powder of an electrically conductive ceramic, or the molded body subject to a heat treatment. Moreover, the powder of the electrically conductive ceramic may be produced by adding conductive coatings to surfaces of powder of a ceramic.

On the other hand, the hard electrode 41 is composed of a solid body of graphite, tungsten alloys or copper alloys.

Next, the repair method of the machine component in accordance with the first embodiment will be described hereinafter with reference to FIG. 3, FIG. 4(a), FIG. 4(b), FIG. 5(a), FIG. 5(b), FIG. 5(c) and FIG. 6.

The repair method of the machine component in accordance with the first embodiment is a method for repairing a tip end portion of the blade 5 as the portion to be repaired and provided with a (1-1) removal step, a (1-2) thin film step, a (1-3) thin film modification step, a (1-4) deposition step, a (1-5) finish step and a (1-6) hard thin film step.

(1-1) Removal Step

The turbine rotor blade 1 as the machine component is set at the jig 27 so as to direct the tip end portion of the blade 5 upward. Next, by means of driving the X-axis servo-motor 19 and the Y-axis servo-motor 21, the table 17 is moved in the X-axis direction and the Y-axis direction to position the turbine rotor blade 1 so that a removed portion 5e of the blade 5 is opposed to the molded electrode 35. Meanwhile, there may be a case where the table 17 is only necessary to be moved in the X-axis direction.

Figure 4:
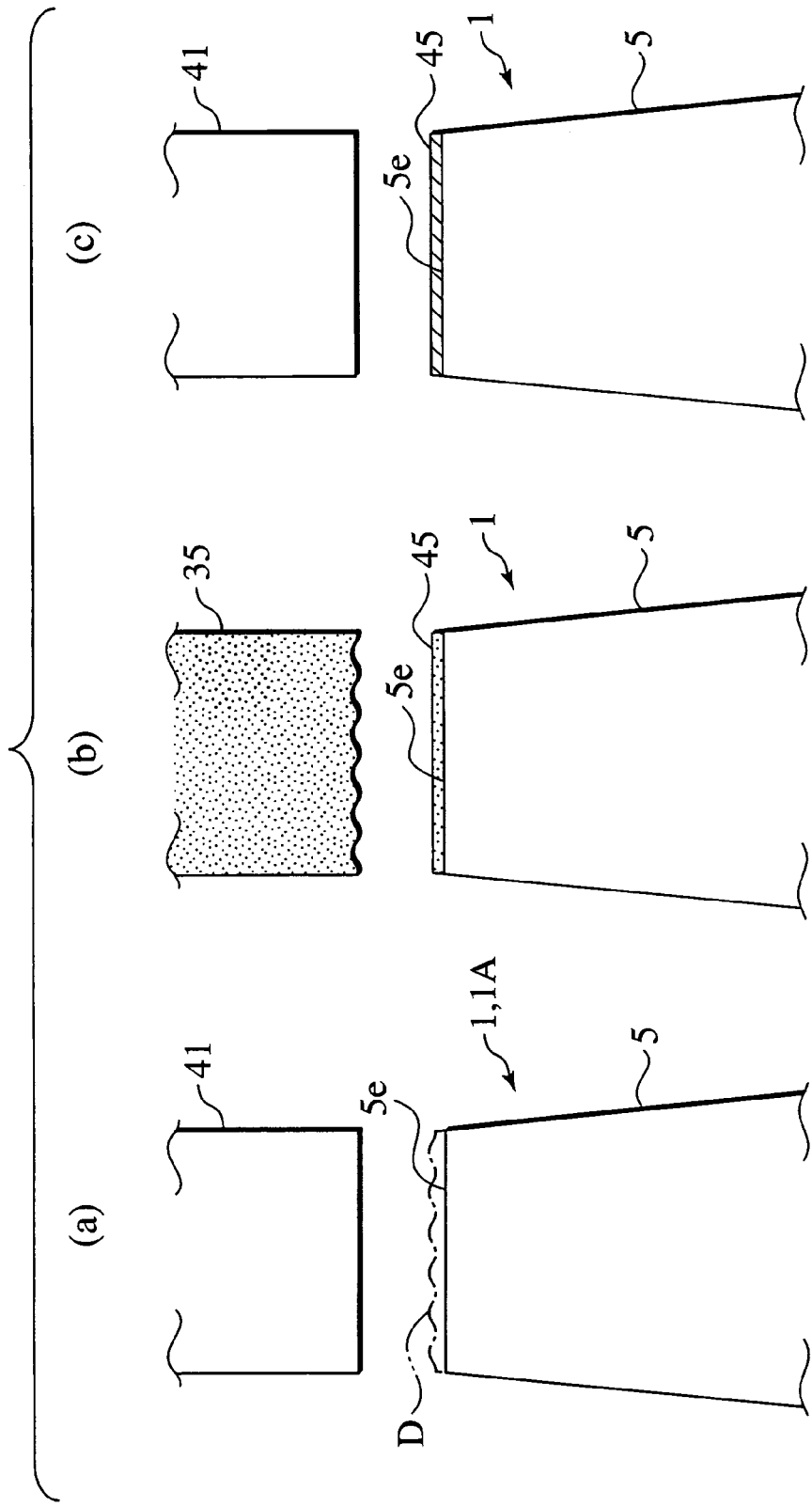
[FIG. 4]

Further, a pulsing electric discharge is generated between the tip end portion of the blade 5 and the hard electrode 41 in an electrically insulating liquid S. Thereby, as shown in FIG. 4(a), by means of energy of the electric discharge, a defect D such as a crack occurred to the tip end portion of the blade 5 can be removed. Meanwhile, when generating the pulsing discharge, the electrode, as being integral with the processing head 31, is reciprocated in the Z-axis direction by a small travel distance by means of driving the Z-axis servo-motor 33. Moreover, in the blade 5, a portion from which the defect D is removed is referred to as a removed portion 5e.

(1-2) Thin Film Step

After finishing the (1-1) removal step, by means of driving the X-axis servo-motor 19 and the Y-axis servo-motor 21, the table 17 is moved in the X-axis direction and the Y-axis direction to position the turbine rotor blade 1 so that the removed portion 5e of the blade 5 is opposed to the molded electrode 35. Meanwhile, there may be a case where the table 17 is only necessary to be moved in the X-axis direction.

Further, a pulsing electric discharge is generated between the removed portion 5e of the blade 5 and the molded electrode 35 in an electrically insulating liquid S. Thereby, as shown in FIG. 4(b), by means of energy of the electric discharge, a material of the molded electrode 35 or a reaction substance of the material carries out deposition, diffusion and/or welding at the removed portion 5e of the blade 5 and thereby a porous thin film 45 can be gradually formed at the removed portion 5e of the blade 5. Meanwhile, when generating the pulsing discharge, the molded electrode 35, as being integral with the processing head 31, is reciprocated in the Z-axis direction by a small travel distance by means of a drive of the Z-axis servo-motor 33.

Meanwhile, "deposition, diffusion and/or welding" means all meanings including "desposition", "diffusion", "welding", "mixed phenomena of deposition and diffusion", "mixed phenomena of deposition and welding", "mixed phenomena of diffusion and welding" and "mixed phenomena of deposition, diffusion and welding".

(1-3) Thin Film Modification Step

After finishing the (1-2) thin film step, by means of driving the X-axis servo-motor 19 and the Y-axis servo-motor 21, the table 17 is moved in the X-axis direction and the Y-axis direction to position the turbine rotor blade 1 so that the thin film 45 is opposed to the hard electrode 41. Meanwhile, there may be a case where the table 17 is only necessary to be moved in the X-axis direction.

Further, a pulsing electric discharge is generated between the porous thin film 45 and the hard electrode 41 in an electrically insulating liquid S. Thereby, as shown in FIG. 4(c), by means of energy of the electric discharge, the thin film 45 can be changed from a porous state into a high-density state by melting the thin film 45. Meanwhile, when generating the pulsing discharge, the hard electrode 41, as being integral with the processing head 31, is reciprocated in the Z-axis direction by a small travel distance by means of a drive of the Z-axis servo-motor 33.

(1-4) Deposition Step

After finishing the (1-3) thin film modification step, by means of driving the X-axis servo-motor 19 and the Y-axis servo-motor 21, the table 17 is moved in the X-axis direction and the Y-axis direction to position the turbine rotor blade 1 so that the thin film 45 is opposed to the molded electrode 35. Meanwhile, there may be a case where the table 17 is only necessary to be moved in the X-axis direction.

Figure 5:
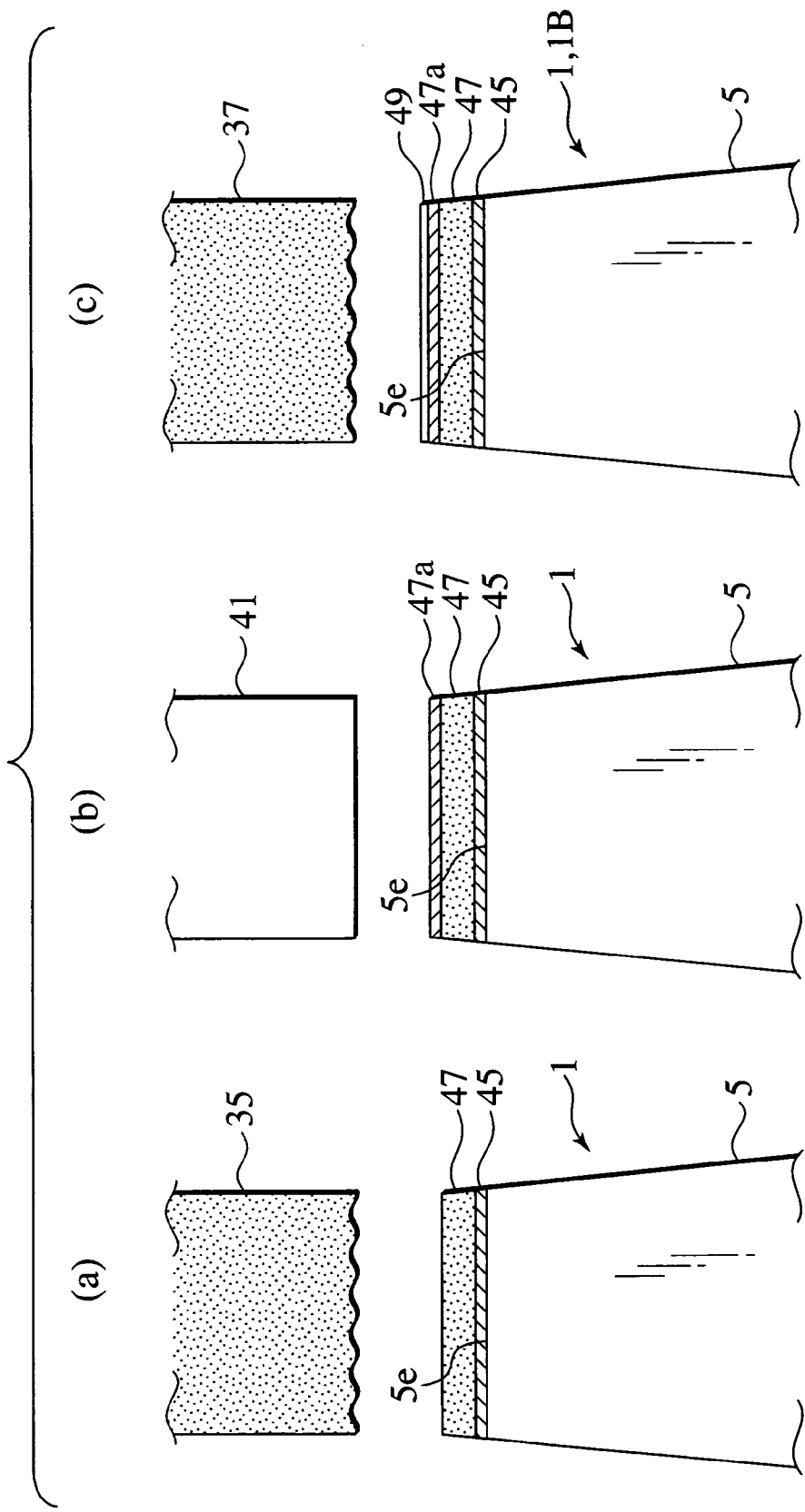
[FIG. 5]

Further, a pulsing electric discharge is generated between the thin film 45 and the molded electrode 35 in an electrically insulating liquid S. Thereby, as shown in FIG. 5(a), by means of energy of the electric discharge, a material of the molded electrode 35 or a reaction substance of the material carries out deposition, diffusion and/or welding at the thin film 45 and thereby a porous deposition 47 can be gradually formed at the thin film 45. Meanwhile, when generating the pulsing discharge, the molded electrode 35, as being integral with the processing head 31, is reciprocated in the Z-axis direction by a small travel distance by means of a drive of the Z-axis servo-motor 33.

Figure 6:
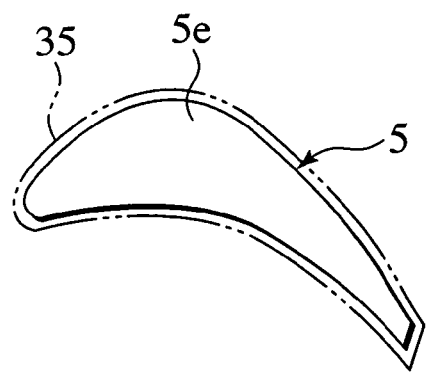
[FIG. 6] A drawing explaining a relation between a removed portion of a blade and a molded electrode.

Here, to exhaust a portion which sticks out of the removed portion 5e of the blade 5 in a view from the discharge direction as shown in FIG. 6 when the pulsing electric discharge is generated between the thin film 45 and the molded electrode 37, a shape of the tip end portion of the molded electrode 35 is made slightly larger than a shape of the removed portion 5e of the blade 5. Meanwhile, an amount t by which the molded electrode 35 sticks out is preferably 0.02 mm or more and 0.3 mm or less.

(1-5) Finish Step

After finishing the (1-4) deposition step, by means of driving the X-axis servo-motor 19 and the Y-axis servo-motor 21, the table 17 is moved in the X-axis direction and the Y-axis direction to position the turbine rotor blade 1 so that the deposition 47 is opposed to the hard electrode 41. Meanwhile, there may be a case where the table 17 is only necessary to be moved in the X-axis direction.

Further, a pulsing electric discharge is generated between the deposition 47 and the hard electrode 41 in an electrically insulating liquid S. Thereby, as shown in FIG. 5(b), by means of energy of the electric discharge, a finish machining to required dimension can be carried out so as to make a thickness of the deposition 47 to be a predetermined thickness with forming a high-density thin film 47a at a surface side of the deposition 47 by melting the surface side of the deposition 47. Meanwhile, when generating the pulsing discharge, the hard electrode 41, as being integral with the processing head 31, is reciprocated in the Z-axis direction by a small travel distance by means of a drive of the Z-axis servo-motor 33.

(1-6) Hard Thin Film Step

After finishing the (1-5) finish step, the molded electrode 35 is detached from the first holder 39 and the hard molded electrode 37 is made to be supported by the first holder 39. Next, by means of driving the X-axis servo-motor 19 and the Y-axis servo-motor 21, the table 17 is moved in the X-axis direction and the Y-axis direction to position the turbine rotor blade 1 so that the deposition 47 is opposed to the hard molded electrode 37. Meanwhile, there may be a case where the table 17 is only necessary to be moved in the X-axis direction.

Further, a pulsing electric discharge is generated between the deposition 47 and the hard molded electrode 37 in an electrically insulating liquid S. Thereby, as shown in FIG. 5(c), by means of energy of the electric discharge, a material of the hard molded electrode 37 or a reaction substance of the material carries out deposition, diffusion and/or welding at the deposition 47 and thereby a hard thin film 49 having abrasiveness can be formed and then the repair of the tip end portion of the blade 5 is finished. Meanwhile, the abrasiveness means a quality of capability of easily abrading an opposite component.

Meanwhile, the repair method of the machine component in accordance with the first embodiment may be modified in view of the embodiment as described below.

More specifically, the (1-2) thin film step and the (1-3) thin film modification step can be omitted from the series of the steps in the repair method of the machine component in accordance with the first embodiment or the (1-6) hard thin film step can be omitted.

Moreover, instead of generating the pulsing discharge in the electrically insulating liquid S, a pulsing discharge may be generated in an electrically insulating gas.

Furthermore, instead of the hard molded electrode 37, as shown in FIG. 5(c), a Si electrode 51 composed of a solid body of Si, a molded body molded from powder of Si by compression by pressing, or the molded body subject to a heat treatment by means of a vacuum furnace or such may be used. Further, in this case, a pulsing electric discharge is generated in an electrically insulating liquid containing alkane hydrocarbons. Meanwhile, the Si electrode 51 may be formed by slurry pouring, MIM (Metal Injection Molding), spray forming and such.

Moreover, by using a grinding lathe instead of the electric spark machine 11, the defect D of the tip end portion of the blade 5 may be removed and the finish machining to required dimension may be carried out so as to make a thickness of the deposition 47 to be a predetermined thickness.

Furthermore, after finishing the (1-6) hard thin film step, a peening step to process a surface side of the hard thin film 49 with a peening treatment may be added.

Next, operations of the first embodiment will be described.

Because the deposition 47 is formed by means of the energy of the electric discharge, a range of the deposition 47 can be limited within a range where the electric discharge is generated and hence it is prevented to generate an excessive deposition at a time of forming the deposition 47.

Moreover, because the deposition 47 is formed by means of energy of the electric discharge and the energy of the electric discharge locally acts on a prominently small part in the removed part 5e of the blade 5, rapid temperature rise of the tip end portion of the blade 5 is prevented at a time of forming the deposition 47.

Furthermore, because the thin film 45, the deposition 47 and the hard thin film 49 are formed by means of the energy of the electric discharge, a boundary part between the thin film 45 and the blade 5, a boundary part between the deposition 47 and the thin film 45 and a boundary part between the hard thin film 49 and the deposition 47 respectively have structures in which composition ratios grade and hence the hard thin film 49 and the deposition 47 can be firmly combined with a base material of the blade 5 via the thin film 45.

Moreover, because, as well as the thin film 45 is formed at the removed portion 5e of the blade 5 and the thin film 45 is melted to change the porous state into the high-density state by means of the energy of the electric discharge, the surface side of the porous deposition 47 is melted to form the high-density thin film 47a at the surface side of the deposition 47, air permeability of the surface side and a rear side of the deposition 47 is made to be lost so that oxidation resistance of the turbine rotor blade 1 after repair can be increased.

Furthermore, in a case where the peening step is added after finishing the (1-6) hard thin film step, residual compression stress can be given to the surface side of the deposition 47 so that a fatigue strength of the deposition 47 can be increased.

In accordance with the first embodiment as described above, because the range of the deposition 47 can be limited within the range where the electric discharge is generated so that the excessive deposition is prevented from generating at the time of forming the deposition 47, troublesome works after forming the deposition 47 can be reduced and a time required for repairing the tip end portion of the blade 5 can be shortened. In particular, because the steps progress from the (1-1) removal step to the (1-6) hard thin film step by means of the single electric spark machine 11, the time required for the repair can be further shortened.

Moreover, because rise in the temperature of the tip end portion of the blade 5 at the time of forming the deposition 47 can be sufficiently suppressed, occurrence of fracture at the tip end portion of the blade 5 by thermal contraction is prevented so that defective repair of the turbine rotor blade 1 can be avoided as possible.

Furthermore, because the hard thin film 49 and the deposition 47 can be firmly combined with the base material of the blade 5 via the thin film 45, the hard thin film 49 and the deposition 47 become unsusceptible to peeling off from the base material of the blade 5 and hence quality of the turbine rotor blade 1 after the repair can be stabilized.

Moreover, because oxidation resistance of the turbine rotor blade 1 after the repair can be improved, the quality of the turbine rotor blade 1 after the repair can be improved. In particular, in the case where the peening step is added after finishing the (1-6) hard thin film step, the fatigue strength of the deposition 47 can be increased and hence the quality of the turbine rotor blade 1 after the repair can be further improved.

Furthermore, in a case where the turbine rotor blade 1 after the repair is applied to the gas turbine engine 3, even if difference in thermal expansion between the base material of the blade 5 and the hard thin film 49 is generated, crack of the hard thin film 49 can be suppressed by means of the porous deposition 47 and, even if the crack occurred to the hard thin film 49, propagation of the crack of the hard thin film 49 to the base material of the blade 5 could be prevented.

Modified Example

Figure 7:
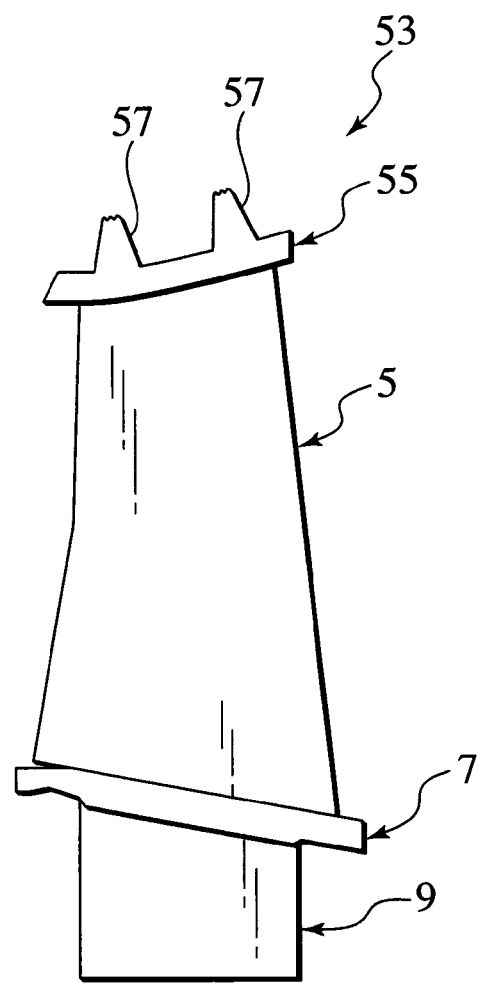
[FIG. 7] A drawing showing a turbine rotor blade in accordance with a modified example of the first embodiment.

A modified example of the first embodiment will be described hereinafter with reference to FIG. 7 and FIG. 2.

A turbine rotor blade 53 in accordance with the modified example is, like as the turbine rotor blade 1, one of the electrically conductive machine components and re-used in a gas turbine engine 3 by processed with repair.

Moreover, the turbine rotor blade 53 in accordance with the modified example is composed of a blade 5, a platform 7, a dovetail 9 and a shroud 55 formed at a tip end portion of the blade 5. Here, the shroud 55 is provided with a pair of tip seals 57.

Tip end portions of the pair of the tip seals 57 in the shroud 55 serve as portions to be treated of the turbine rotor blade 53.

Further, the repair in accordance with the first embodiment may be processed with respect to the pair of the tip seals 57 in the shroud 55 and this modified example also accomplishes operations and functions similar to the operations and the functions of the aforementioned first embodiment.

Second Embodiment

A production method of a restored machine component in accordance with a second embodiment will be described hereinafter with reference to FIG. 2, FIG. 3, FIG. 4(a), FIG. 4(b), FIG. 4(c), FIG. 5(a), FIG. 5(b), FIG. 5(c).

The production method of the restored machine component in accordance with the second embodiment is an invention for production of a restored turbine rotor blade 1B as the restored machine component shown in FIG. 5(c) from an original turbine rotor blade 1A as an original machine component shown in FIG. 4(a) and, in other words, an invention taken from the repair method of the machine component in accordance with the first embodiment from another viewpoint. Further, the production method of the restored machine component in accordance with the second embodiment is also provided with a (2-1) removal step, a (2-2) thin film step, a (2-3) thin film modification step, a (2-4) deposition step, a (2-5) finish step and a (2-6) hard thin film step like as the repair method of the machine component in accordance with the first embodiment. Moreover, in the production method of the restored machine component in accordance with the second embodiment, the electric spark machine 11, the molded electrode 35, the hard molded electrode 37 and the hard electrode 41 as described above are used.

Figure 2:
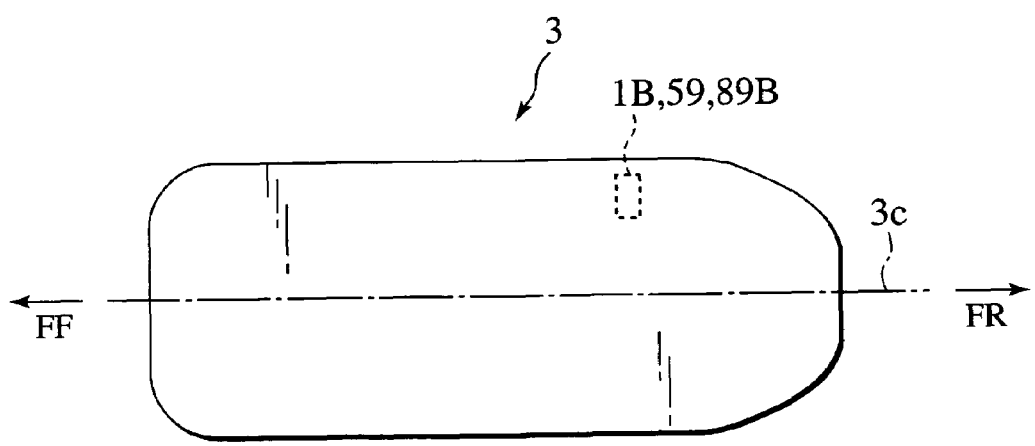
[FIG. 2] A schematic drawing of a gas turbine engine in accordance with embodiments.

Meanwhile, the restored turbine rotor blade 1B is used in the gas turbine engine 3 shown in FIG. 2 and rotatable around an axial center of the gas turbine engine 3. Moreover, the tip end portion of the blade 5 serves as a portion to be treated of the original turbine rotor blade 1A.

(2-1) Removal Step

The turbine rotor blade 1A as the original machine component is set at the jig 27 so as to direct the tip end portion of the blade 5 upward. Next, by means of driving the X-axis servo-motor 19 and the Y-axis servo-motor 21, the table 17 is moved in the X-axis direction and the Y-axis direction to position the turbine rotor blade 1A so that a removed portion 5e of the blade 5 is opposed to the molded electrode 35. Further, a pulsing electric discharge is generated between the tip end portion of the blade 5 and the hard electrode 41 in an electrically insulating liquid S. Thereby, as shown in FIG. 4(a), by means of energy of the electric discharge, a defect D such as a crack occurred to the tip end portion of the blade 5 can be removed. Meanwhile, in the blade 5, a portion from which the defect D is removed is referred to as a removed portion 5e.

(2-2) Thin Film Step

After finishing the (2-1) removal step, by means of driving the X-axis servo-motor 19 and the Y-axis servo-motor 21, the table 17 is moved in the X-axis direction and the Y-axis direction to position the original turbine rotor blade 1A so that the removed portion 5e of the blade 5 is opposed to the molded electrode 35. Further, a pulsing electric discharge is generated between the removed portion 5e of the blade 5 and the molded electrode 35 in an electrically insulating liquid S. Thereby, as shown in FIG. 4(b), by means of energy of the electric discharge, a material of the molded electrode 35 or a reaction substance of the material carries out deposition, diffusion and/or welding at the removed portion 5e of the blade 5 and thereby a porous thin film 45 can be gradually formed at the removed portion 5e of the blade 5.

(2-3) Thin Film Modification Step

After finishing the (2-2) thin film step, by means of driving the X-axis servo-motor 19 and the Y-axis servo-motor 21, the table 17 is moved in the X-axis direction and the Y-axis direction to position the original turbine rotor blade 1A so that the thin film 45 is opposed to the hard electrode 41. Further, a pulsing electric discharge is generated between the porous thin film 45 and the hard electrode 41 in an electrically insulating liquid S. Thereby, as shown in FIG. 4(c), by means of energy of the electric discharge, the thin film 45 can be changed from a porous state into a high-density state by melting the thin film 45.

(2-4) Deposition Step

After finishing the (2-3) thin film modification step, by means of driving the X-axis servo-motor 19 and the Y-axis servo-motor 21, the table 17 is moved in the X-axis direction and the Y-axis direction to position the original turbine rotor blade 1A so that the thin film 45 is opposed to the molded electrode 35. Further, a pulsing electric discharge is generated between the thin film 45 and the molded electrode 35 in an electrically insulating liquid S. Thereby, as shown in FIG. 5(a), by means of energy of the electric discharge, a material of the molded electrode 35 or a reaction substance of the material carries out deposition, diffusion and/or welding at the thin film 45 and thereby a porous deposition 47 can be formed at the thin film 45.

Here, to exhaust a portion which sticks out of the removed portion 5e of the blade 5 in a view from the discharge direction as shown in FIG. 6 when the pulsing electric discharge is generated between the thin film 45 and the molded electrode 37, a shape of the tip end portion of the molded electrode 35 is made slightly larger than a shape of the removed portion 5e of the blade 5. Meanwhile, an amount t by which the molded electrode 35 sticks out is preferably 0.02 mm or more and 0.3 mm or less.

(2-5) Finish Step

After finishing the (2-4) deposition step, by means of driving the X-axis servo-motor 19 and the Y-axis servo-motor 21, the table 17 is moved in the X-axis direction and the Y-axis direction to position the original turbine rotor blade 1A so that the deposition 47 is opposed to the hard electrode 41. Further, a pulsing electric discharge is generated between the deposition 47 and the hard electrode 41 in an electrically insulating liquid S. Thereby, as shown in FIG. 5(b), by means of energy of the electric discharge, a finish machining to required dimension can be carried out so as to make a thickness of the deposition 47 to be a predetermined thickness with forming a high-density thin film 47a at a surface side of the deposition 47 by melting the surface side of the deposition 47.

(2-6) Hard Thin Film Step

After finishing the (2-5) finish step, the molded electrode 35 is detached from the first holder 39 and the hard molded electrode 37 is made to be supported by the first holder 39. Next, by means of driving the X-axis servo-motor 19 and the Y-axis servo-motor 21, the table 17 is moved in the X-axis direction and the Y-axis direction to position the original turbine rotor blade 1A so that the deposition 47 is opposed to the hard molded electrode 37. Further, a pulsing electric discharge is generated between the deposition 47 and the hard molded electrode 37 in an electrically insulating liquid S. Thereby, as shown in FIG. 5(c), by means of energy of the electric discharge, a material of the hard molded electrode 37 or a reaction substance of the material carries out deposition, diffusion and/or welding at the deposition 47 and thereby a hard thin film 49 having abrasiveness can be formed and then the production of the restored turbine rotor blade 1B is finished.

Meanwhile, the production method of the restored machine component may be modified in view of the embodiments like as the repair method of the machine component in accordance with the first embodiment.

Next, operations of the second embodiment will be described.

Because the deposition 47 is formed by means of the energy of the electric discharge, a range of the deposition 47 can be limited within a range where the electric discharge is generated and hence it is prevented to generate an excessive deposition at a time of forming the deposition 47.

Moreover, because the deposition 47 is formed by means of energy of the electric discharge and the energy of the electric discharge locally acts on a prominently small part in the removed part 5e of the blade 5, rapid temperature rise of the tip end portion of the blade 5 is prevented at a time of forming the deposition 47.

Furthermore, because the thin film 45, the deposition 47 and the hard thin film 49 are formed by means of the energy of the electric discharge, a boundary part between the thin film 45 and the blade 5, a boundary part between the deposition 47 and the thin film 45 and a boundary part between the hard thin film 49 and the deposition 47 respectively have structures in which composition ratios grade and hence the hard thin film 49 and the deposition 47 can be firmly combined with a base material of the blade 5 via the thin film 45.

Moreover, because, as well as the thin film 45 is formed at the removed portion 5e of the blade 5 and the thin film 45 is melted to change the porous state into the high-density state by means of the energy of the electric discharge, the surface side of the porous deposition 47 is melted to form the high-density thin film 47a at the surface side of the deposition 47, air permeability of the surface side and a rear side of the deposition 47 is made to be lost so that oxidation resistance of the restored turbine rotor blade 1B can be increased.

Furthermore, in a case where the peening step is added after finishing the (2-6) hard thin film step, residual compression stress can be given to the surface side of the deposition 47 so that a fatigue strength of the deposition 47 can be increased.

In accordance with the first embodiment as described above, because the range of the deposition 47 can be limited within the range where the electric discharge is generated so that the excessive deposition is prevented from generating at the time of forming the deposition 47, troublesome works after forming the deposition 47 can be reduced and a time required for the production of the restored turbine rotor blade 1B can be shortened. In particular, because the steps progress from the (2-1) removal step to the (2-6) hard thin film step by means of the single electric spark machine 11, the time required for the production can be further shortened.

Moreover, because the temperature rise of the tip end portion of the blade 5 at the time of forming the deposition 47 can be sufficiently suppressed, occurrence of fracture at the tip end portion of the blade 5 by thermal contraction is prevented so that defective production of the restored turbine rotor blade 1B can be avoided as possible.

Furthermore, because the hard thin film 49 and the deposition 47 can be firmly combined with the base material of the blade 5 via the thin film 45, the hard thin film 49 and the deposition 47 become unsusceptible to peeling off from the base material of the blade 5 and hence quality of the restored turbine rotor blade 1B can be stabilized.

Moreover, because oxidation resistance of the restored turbine rotor blade 1B can be improved, the quality of the restored turbine rotor blade 1B can be improved. In particular, in the case where the peening step is added after finishing the (2-6) hard thin film step, the fatigue strength of the deposition 47 can be increased and hence the quality of the restored turbine rotor blade 1B can be further improved.

Furthermore, in a case where the restored turbine rotor blade 1B is applied to the gas turbine engine 3, even if difference in thermal expansion between the base material of the blade 5 and the hard thin film 49 is generated, crack of the hard thin film 49 can be suppressed by means of the porous deposition 47 and, even if the crack occurred to the hard thin film 49, propagation of the crack of the hard thin film 49 to the base material of the blade 5 could be prevented.

Third Embodiment

Figure 8:
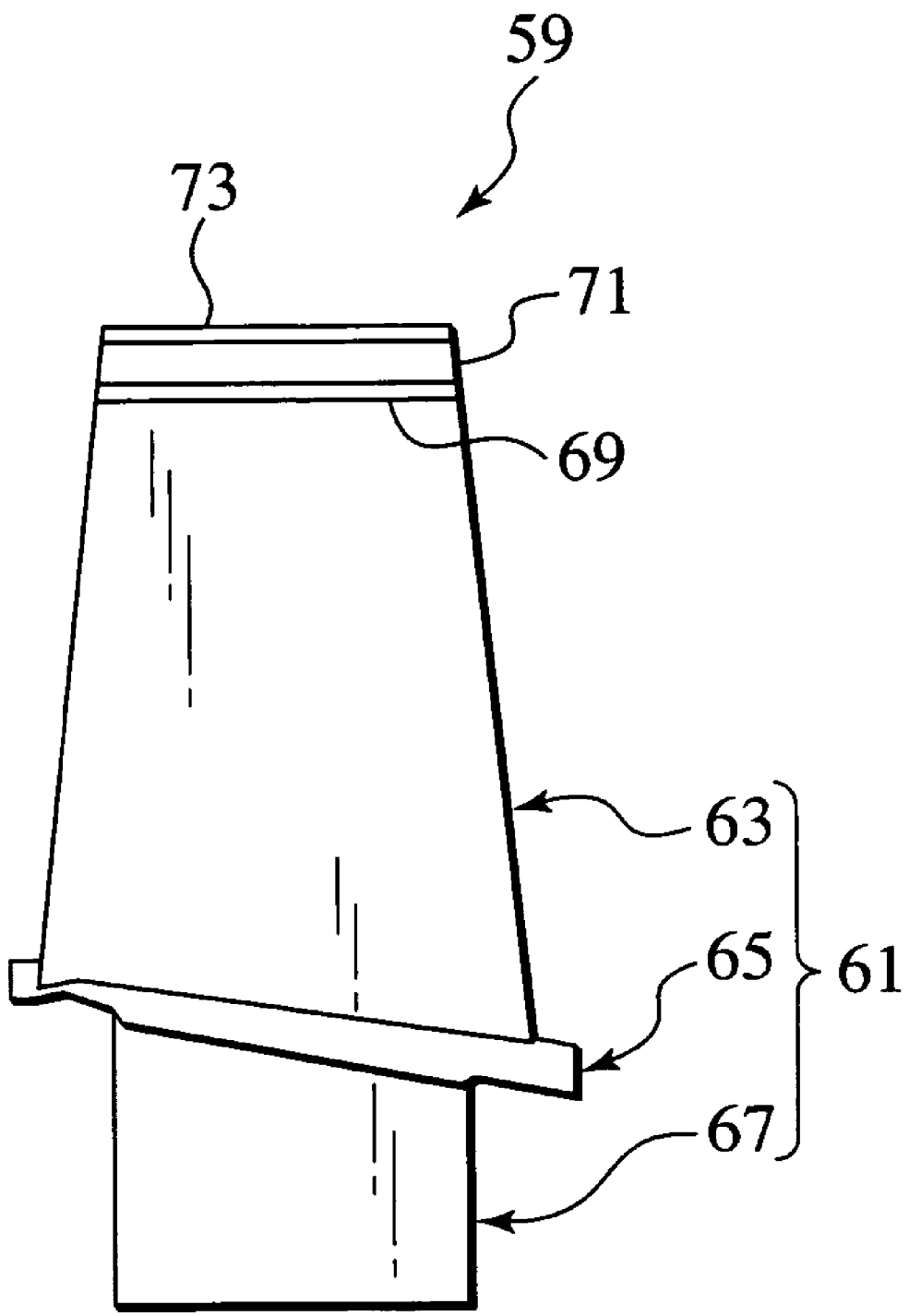
[FIG. 8] A drawing showing a turbine rotor blade in accordance with a third embodiment.

First, a turbine rotor blade 59 in accordance with a third embodiment will be described hereinafter with reference to FIG. 1 and FIG. 8.

A turbine rotor blade 59 in accordance with the third embodiment is used in the gas turbine engine 3 and rotatable around the axial center of the gas turbine engine 3. Moreover, the turbine rotor blade 59 is provided with a rotor blade main body 61 as an electrically conductive component main body and the rotor blade main body 61 is composed of a blade 63, a platform 65 formed at a proximal end of the blade 63 and a dovetail 67 formed at the platform 65. Here, the dovetail 67 is engageable with the dovetail slot (not shown) of the turbine disk (not shown) as the component element of the gas turbine engine. At a tip end portion of the blade 63, a porous deposition 71 is formed with interposing a thin film 69 and a hard thin film 73 having abrasiveness is formed at the deposition 71.

Meanwhile, the tip end portion of the blade 63 serves as a portion to be treated of the rotor blade main body 61.

Next, a production method of a machine component in accordance with the third embodiment will be described hereinafter with reference to FIG. 3, FIG. 9(a), FIG. 9(b), FIG. 9(c), FIG. 10(a), FIG. 10(b) and FIG. 10(c).

The production method of the machine component in accordance with the third embodiment is a method for production of the turbine rotor blade 59 as the machine component and provided with a (3-1) main body molding step, a (3-2) thin film step, a (3-3) thin film modification step, a (3-4) deposition step, a (3-5) finish step and a (3-6) hard thin film step as described later. Moreover, in the production method of the machine component in accordance with the third embodiment, the electric spark machine, the molded electrode, the hard molded electrode and the hard electrode as described above are used.

(3-1) Main Body Molding Step

Figure 9:
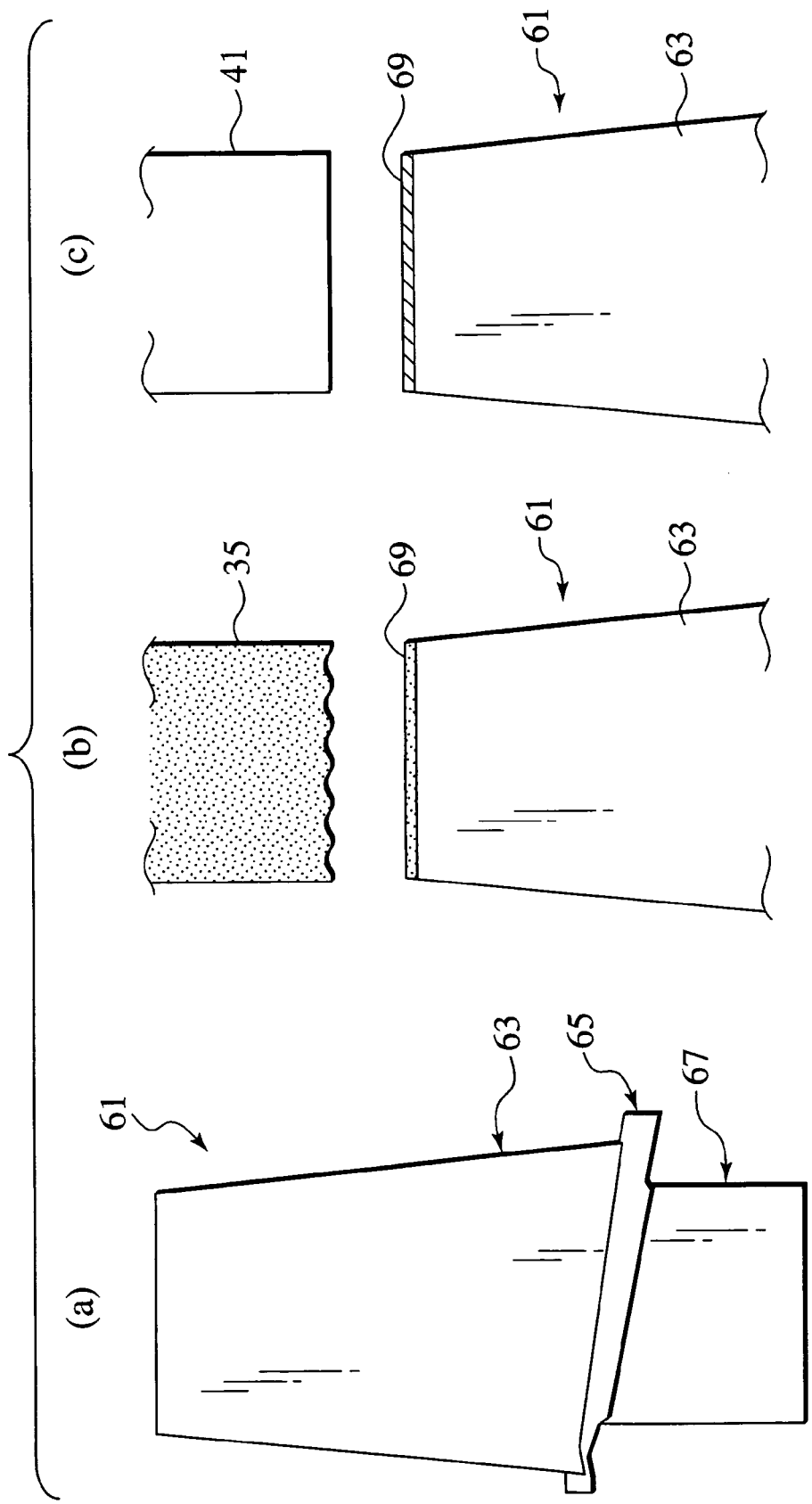
[FIG. 9]

As shown in FIG. 9(a), a major part of the rotor blade main body 61 is molded by means of forging or casting. And, the remaining part of the rotor blade main body 61 such as a peripheral shape of the dovetail 67 for example is formed by means of machining such as grinding. Further, a part except the tip end portion of the blade 63 in the rotor blade main body 61 may be subject to formation of an oxidation-resistive coating such as an aluminized coating.

(3-2) Thin Film Step

The rotor blade main body 61 as the component main body is set at the jig 27 so that the tip end portion of the blade 63 is directed upward. Next, by means of driving the X-axis servo-motor 19 and the Y-axis servo-motor 21, the table 17 is moved in the X-axis direction and the Y-axis direction to position the rotor blade main body 61 so that the tip end portion of the blade 63 is opposed to the molded electrode 35. Meanwhile, there may be a case where the table 17 is only necessary to be moved in the X-axis direction.

Further, a pulsing electric discharge is generated between the tip end portion of the blade 63 and the molded electrode 35 in an electrically insulating liquid S. Thereby, as shown in FIG. 9(b), by means of energy of the electric discharge, a material of the molded electrode 35 or a reaction substance of the material carries out deposition, diffusion and/or welding at the tip end portion of the blade 63 and thereby a porous thin film 69 can be formed at the tip end portion of the blade 63. Meanwhile, when generating the pulsing discharge, the molded electrode 35, as being integral with the processing head 31, is reciprocated in the Z-axis direction by a small travel distance by means of a drive of the Z-axis servo-motor 33.

(3-3) Thin Film Modification Step

After finishing the (3-2) thin film step, by means of driving the X-axis servo-motor 19 and the Y-axis servo-motor 21, the table 17 is moved in the X-axis direction and the Y-axis direction to position the rotor blade main body 61 so that the thin film 69 is opposed to the hard electrode 41. Meanwhile, there may be a case where the table 17 is only necessary to be moved in the X-axis direction.

Further, a pulsing electric discharge is generated between the porous thin film 69 and the hard electrode 41 in an electrically insulating liquid S. Thereby, as shown in FIG. 9(c), by means of energy of the electric discharge, the thin film 69 can be changed from a porous state into a high-density state by melting the thin film 69. Meanwhile, when generating the pulsing discharge, the hard electrode 41, as being integral with the processing head 31, is reciprocated in the Z-axis direction by a small travel distance by means of a drive of the Z-axis servo-motor 33.

(3-4) Deposition Step

After finishing the (3-3) thin film modification step, by means of driving the X-axis servo-motor 19 and the Y-axis servo-motor 21, the table 17 is moved in the X-axis direction and the Y-axis direction to position the rotor blade main body 61 so that the thin film 69 is opposed to the molded electrode 35. Meanwhile, there may be a case where the table 17 is only necessary to be moved in the X-axis direction.

Figure 10:
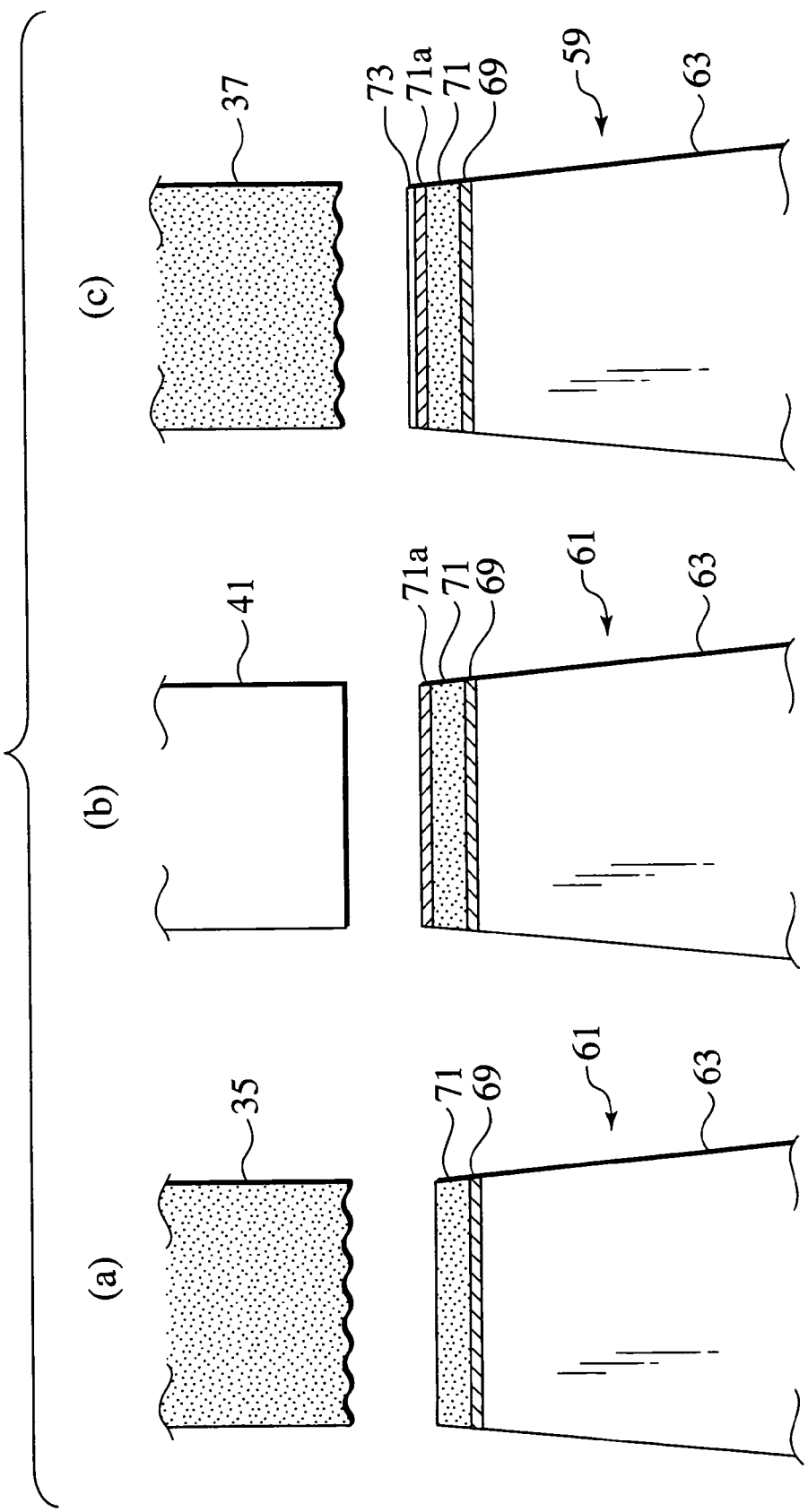
[FIG. 10]

Further, a pulsing electric discharge is generated between the thin film 69 and the molded electrode 35 in an electrically insulating liquid S. Thereby, as shown in FIG. 10(a), by means of energy of the electric discharge, a material of the molded electrode 35 or a reaction substance of the material carries out deposition, diffusion and/or welding at the thin film 69 and thereby a porous deposition 71 can be formed at the high-density thin film 69. Meanwhile, when generating the pulsing discharge, the molded electrode 35, as being integral with the processing head 31, is reciprocated in the Z-axis direction by a small travel distance by means of a drive of the Z-axis servo-motor 33.

Figure 11:
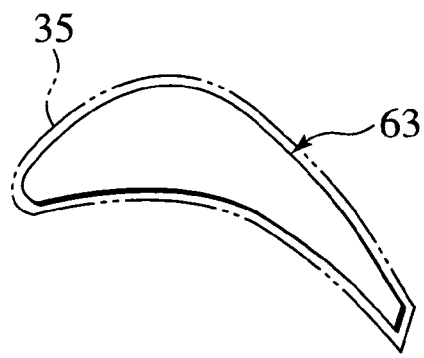
[FIG. 11] A drawing explaining a relation between a tip end portion of the blade and a molded electrode.

Here, to exhaust a portion which sticks out of the tip end portion of the blade 63 in a view from the discharge direction as shown in FIG. 11 when the pulsing electric discharge is generated between the thin film 69 and the molded electrode 37, a shape of the tip end portion of the molded electrode 35 is made slightly larger than a shape of the tip end portion of the blade 63. Meanwhile, an amount t by which the molded electrode 35 sticks out is preferably 0.02 mm or more and 0.3 mm or less.

(3-5) Finish Step

After finishing the (3-4) deposition step, by means of driving the X-axis servo-motor 19 and the Y-axis servo-motor 21, the table 17 is moved in the X-axis direction and the Y-axis direction to position the rotor blade main body 61 so that the deposition 71 is opposed to the hard electrode 41. Meanwhile, there may be a case where the table 17 is only necessary to be moved in the X-axis direction.

Further, a pulsing electric discharge is generated between the deposition 71 and the hard electrode 41 in an electrically insulating liquid S. Thereby, as shown in FIG. 10(b), by means of energy of the electric discharge, a finish machining to required dimension can be carried out so as to make a thickness of the deposition 71 to be a predetermined thickness with forming a high-density thin film 71a at a surface side of the deposition 71 by melting the surface side of the deposition 71. Meanwhile, when generating the pulsing discharge, the hard electrode 41, as being integral with the processing head 31, is reciprocated in the Z-axis direction by a small travel distance by means of a drive of the Z-axis servo-motor 33.

(3-6) Hard Thin Film Step

After finishing the (3-5) finish step, the molded electrode 35 is detached from the first holder 39 and the hard molded electrode 37 is made to be supported by the first holder 39. Next, by means of driving the X-axis servo-motor 19 and the Y-axis servo-motor 21, the table 17 is moved in the X-axis direction and the Y-axis direction to position the rotor blade main body 61 so that the deposition 71 is opposed to the hard molded electrode 37. Meanwhile, there may be a case where the table 17 is only necessary to be moved in the X-axis direction.

Further, a pulsing electric discharge is generated between the deposition 71 and the hard molded electrode 37 in an electrically insulating liquid S. Thereby, as shown in FIG. 10(c), by means of energy of the electric discharge, a material of the hard molded electrode 37 or a reaction substance of the material carries out deposition, diffusion and/or welding at the high-density thin film 71a and thereby a hard thin film 73 having abrasiveness can be formed and then the production of the turbine rotor blade 59 is finished.

Meanwhile, the production method of the machine component may be modified in view of the embodiments as described below.

More specifically, the (3-2) thin film step and the (3-3) thin film modification step can be omitted from the series of the steps in the production method of the machine component in accordance with the third embodiment or the (3-6) hard thin film step can be omitted.

Moreover, instead of generating the pulsing discharge in the electrically insulating liquid S, a pulsing discharge may be generated in an electrically insulating gas.

Furthermore, instead of the hard molded electrode 37, as shown in FIG. 10(c), a Si electrode 51 composed of a solid body of Si, a molded body molded from powder of Si by compression by pressing, or the molded body subject to a heat treatment by means of a vacuum furnace or such may be used. Further, in this case, a pulsing electric discharge is generated in an electrically insulating liquid containing alkane hydrocarbons. Meanwhile, the Si electrode 51 may be formed by slurry pouring, MIM (Metal Injection Molding), spray forming and such.

Moreover, by using a grinding lathe instead of the electric spark machine 11, the finish machining to required dimension may be carried out so as to make a thickness of the deposition 71 to be a predetermined thickness.

Furthermore, after finishing the (3-6) hard thin film step, a peening step to process a surface side of the hard thin film 73 with a peening treatment may be added.

Next, operations of the third embodiment will be described.

Because the deposition 71 is formed by means of the energy of the electric discharge, a range of the deposition 71 can be limited within a range where the electric discharge is generated and hence it is prevented to generate an excessive deposition at a time of forming the deposition 71.

Moreover, because the deposition 71 is formed by means of energy of the electric discharge and the energy of the electric discharge locally acts on a prominently small part in the tip end portion of the blade 63, rapid temperature rise of the tip end portion of the blade 63 is prevented at a time of forming the deposition 71.

Furthermore, because the thin film 69, the deposition 71 and the hard thin film 73 are formed by means of the energy of the electric discharge, a boundary part between the thin film 69 and the blade 63, a boundary part between the deposition 71 and the thin film 69 and a boundary part between the hard thin film 73 and the deposition 71 respectively have structures in which composition ratios grade and hence the hard thin film 73 and the deposition 71 can be firmly combined with a base material of the blade 63 via the thin film 69.

Moreover, because, as well as the high-density thin film 71a is formed at the surface side of the deposition 71, the thin film 69 is changed from the porous state into the high-density state by means of the energy of the electric discharge, air permeability of the surface side and a rear side of the deposition 71 is made to be lost so that oxidation resistance of the turbine rotor blade 59 can be increased.

Furthermore, in a case where the peening step is added after finishing the (3-6) hard thin film step, residual compression stress can be given to the surface side of the deposition 71 so that a fatigue strength of the deposition 71 can be increased.

In accordance with the third embodiment as described above, because the range of the deposition 71 can be limited within the range where the electric discharge is generated so that the excessive deposition is prevented from generating at the time of forming the deposition 71, troublesome works after forming the deposition 71 can be reduced and a time required for production of the turbine rotor blade 59 can be shortened. In particular, because the steps progress from the (3-2) thin film step to the (3-6) hard thin film step by means of the single electric spark machine 11, the time required for the production can be further shortened.

Moreover, because rise in the temperature of the tip end portion of the blade 63 at the time of forming the deposition 71 can be sufficiently suppressed, occurrence of fracture at the tip end portion of the blade 63 by thermal contraction is prevented so that defective production of the turbine rotor blade 59 can be avoided as possible.

Furthermore, because the hard thin film 73 and the deposition 71 can be firmly combined with the base material of the blade 63 via the thin film 69, the hard thin film 73 and the deposition 71 become unsusceptible to peeling off from the base material of the blade 63 and hence quality of the turbine rotor blade 59 can be stabilized.

Moreover, because the air permeability of the surface side and the rear side of the deposition 71 is made lost to improve oxidation resistance of the turbine rotor blade 59, the quality of the turbine rotor blade 59 can be improved. In particular, in the case where the peening step is added after finishing the (3-6) hard thin film step, the fatigue strength of the deposition 71 can be increased and hence the quality of the turbine rotor blade 59 can be further improved.

Furthermore, in a case where the turbine rotor blade 59 is applied to the gas turbine engine 3, even if difference in thermal expansion between the base material of the blade 63 and the hard thin film 73 is generated, crack of the hard thin film 73 can be suppressed by means of the porous deposition 71 and, even if the crack occurred to the hard thin film 73, propagation of the crack of the hard thin film 73 to the base material of the blade 63 could be prevented.

Modified Example

Figure 12:
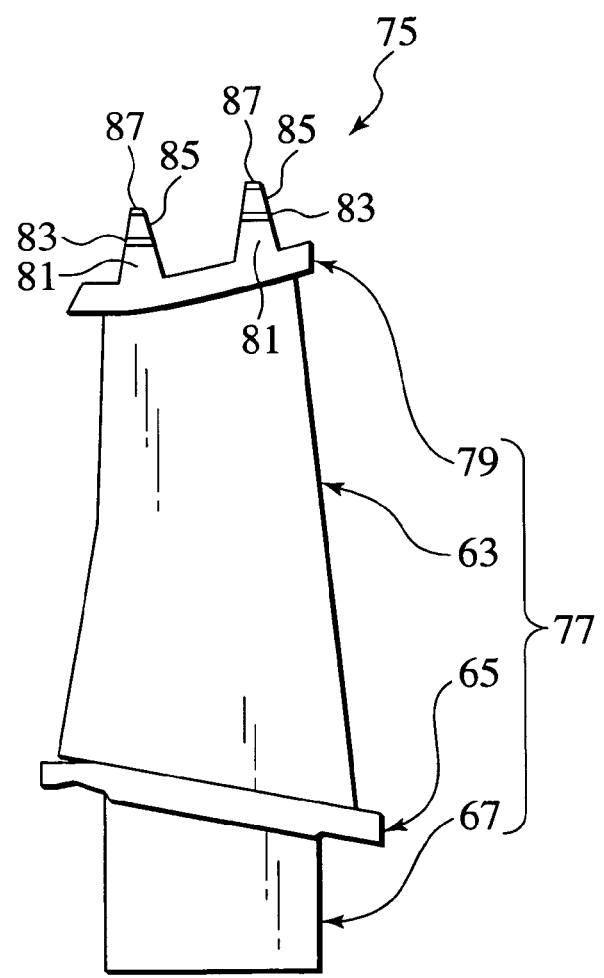
[FIG. 12] A drawing showing a turbine rotor blade in accordance with a modified example of the third embodiment.

A modified example of the third embodiment will be described hereinafter with reference to FIG. 12 and FIG. 2.

A turbine rotor blade 75 in accordance with the modified example is, like as the turbine rotor blade 59, used in a gas turbine engine 3 and rotatable around the axial center of the gas turbine engine 3.

Moreover, the turbine rotor blade 75 is provided with a rotor blade main body 77 as an electrically conductive component main body and the rotor blade main body 77 is composed of a blade 63, a platform 65, a dovetail 67 and a shroud 79 formed at a tip end portion of the blade 63. Here, the shroud 79 is provided with a pair of tip seals 81. Further, at tip end portions of the respective tip seals 57, porous depositions 85 are formed with interposing a high-density thin films 83 and, at the depositions 85, hard thin films 87 having abrasiveness are formed.

Meanwhile, the tip end portions of the pair of the tip seals 81 in the shroud 79 serve as portions to be repaired of the turbine rotor blade 53.

Further, the turbine rotor blade 75 in accordance with the modified example may be also produced by the production method of the machine component in accordance with the third embodiment and the modified example accomplishes operations and functions similar to the operations and the functions of the aforementioned third embodiment.

Fourth Embodiment

Figure 13:
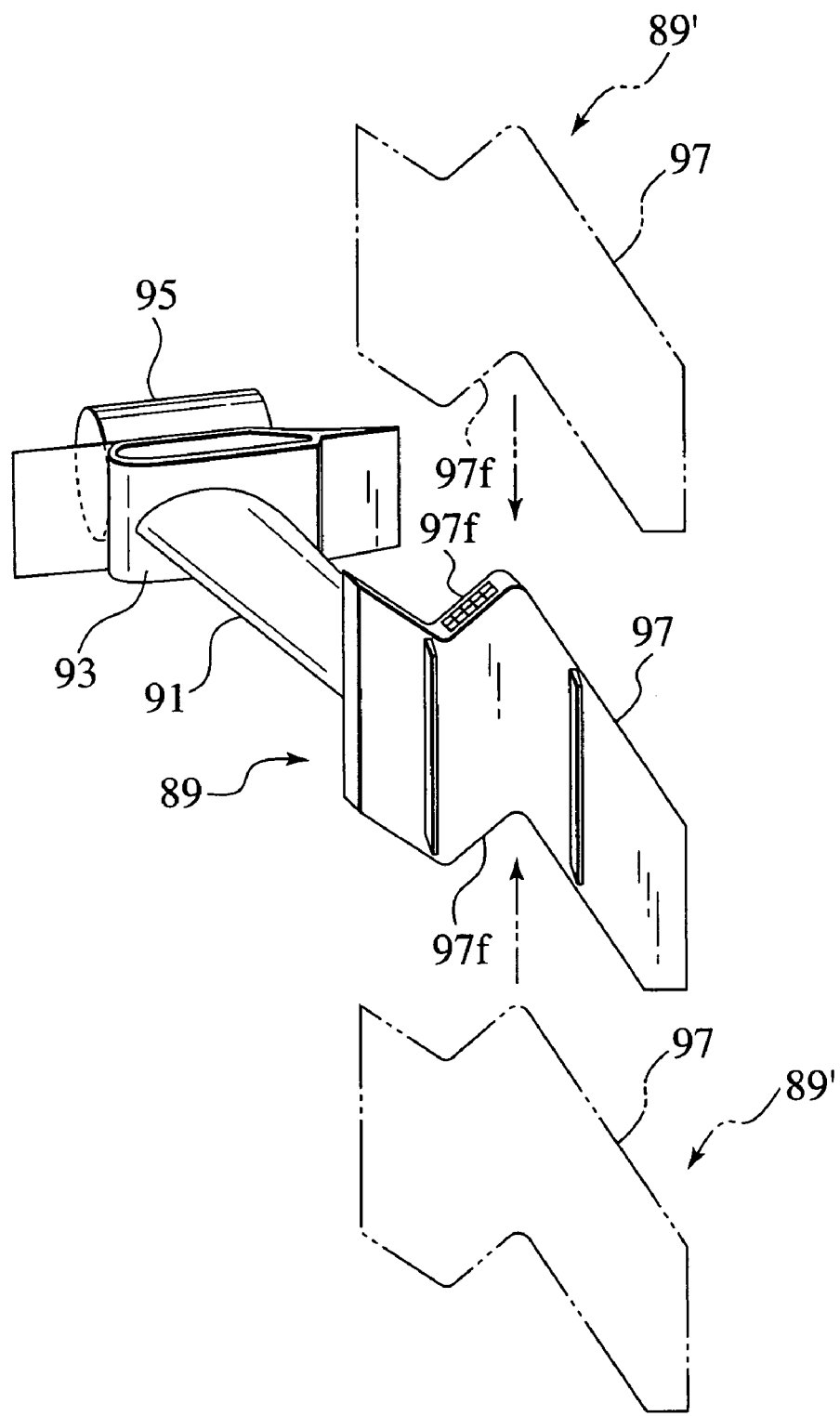
[FIG. 13] A perspective view showing a turbine rotor blade in accordance with a fourth embodiment.

First, a turbine rotor blade 89 which is a subject of a repair method of a machine component in accordance with a fourth embodiment will be described hereinafter with reference to FIG. 13 and FIG. 2.

The turbine rotor blade 89 in accordance with the fourth embodiment is one of electrically conductive machine components and, when being repaired, can be re-used in a gas turbine engine 3 of a jet engine or such.

The turbine rotor blade 89 is provided with a blade 91, a platform 93 formed at a proximal end of the blade 91, a dovetail 95 formed at the platform 93 and a shroud 97 formed at a tip end of the blade 91. Here, the dovetail 95 is engageable with a dovetail slot (not shown) of a turbine disk (not shown) which is a component element of the gas turbine engine 3 and the shroud 97 has a pair of abrasion surfaces 97f.

Meanwhile, the abrasion surfaces 97f are easy to have defects (see FIG. 16(a)) such as cracks caused by abrasion with another abrasion surfaces 97f of the adjacent turbine rotor blade 89' and the pair of the abrasion surfaces 97f in the shroud 97 serve as portions to be treated.

Figure 14:
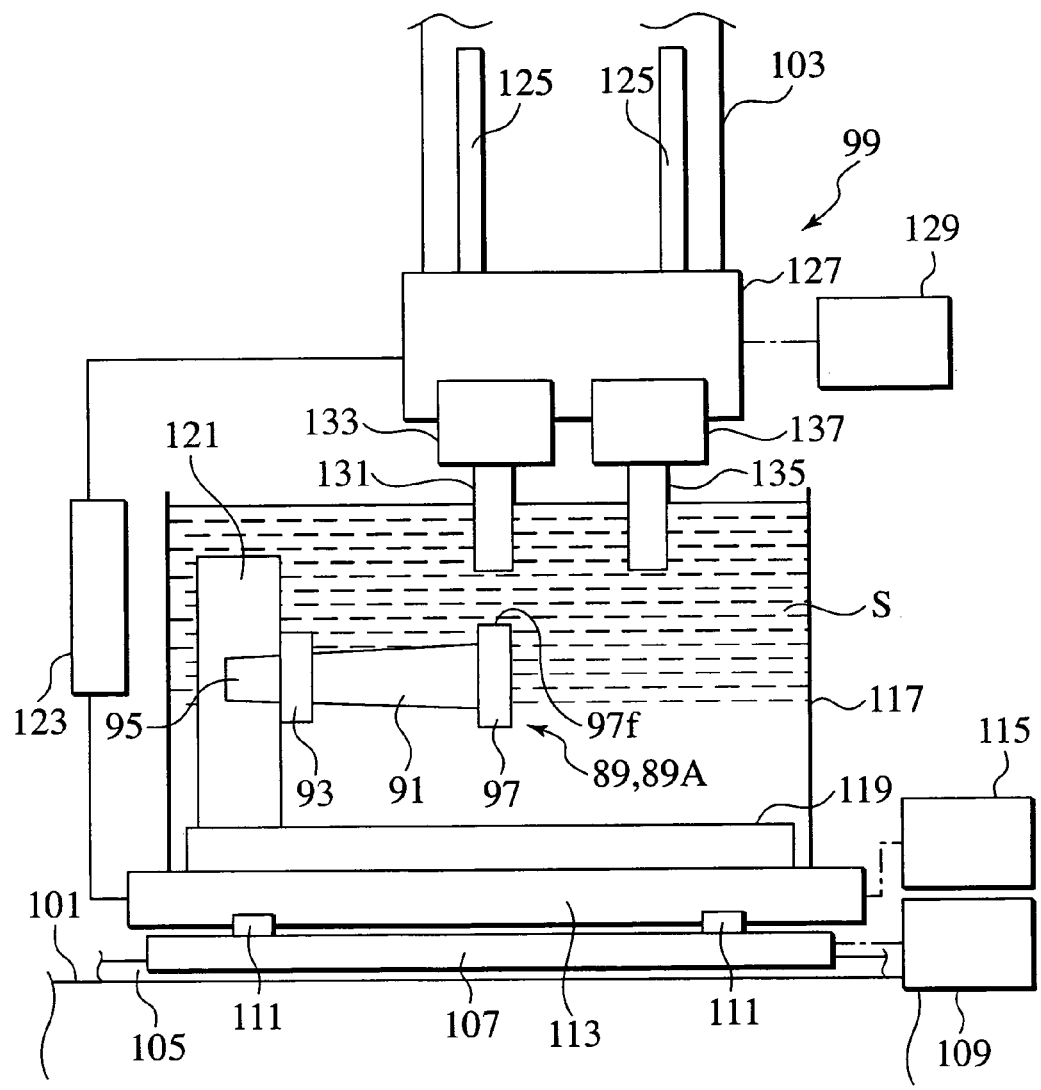
[FIG. 14] A drawing showing an electric spark machine in accordance with the fourth embodiment.

Next, an electric spark machine 99 employed for the repair method of the machine component in accordance with the fourth embodiment will be described hereinafter with reference to FIG. 14.

The electric spark machine 99 in accordance with the fourth embodiment is a machine employed for working of the repair method of the machine component in accordance with the fourth embodiment and provided with a bed 101 extending in an X-axis direction and a Y-axis direction and the bed 101 is provided with a column 103 extending in an Z-axis.

The bed 101 is provided with a pair of X-axis guides 105 extending in the X-axis direction and the pair of the X-axis guides 105 are provided with a slider 107 to be movable in the X-axis direction by means of driving an X-axis servo-motor 109. Moreover, the slider 107 is provided with a pair of Y-axis guides 111 extending in the Y-axis direction and the pair of the Y-axis guides 111 are provided with a table 113 to be movable in the Y-axis direction by means of driving a Y-axis servo-motor 115. Meanwhile, movement of the slider 107 in the X-axis direction by means of driving the X-axis servo-motor 109 leads to movement of the table 113 in the X-axis direction.

The table 113 is provided with a processing tank 117 for reserving an electrically insulating liquid S such as oil and, in the processing tank 117, a support plate 119 is provided. The support plate 119 is provided with a jig 121 to which a machine component such as the turbine rotor blade 89 or a component main body of the machine component described later is capable of being set. Meanwhile, the jig 121 is electrically connected to an electric power source 123.

The column 103 is provided with a pair of Z-axis guides 125 extending in the Z-axis direction and the pair of the Z-axis guides 125 are provided with a processing head 127 to be movable in the Z-axis direction by means of driving a Z-axis servo-motor 129. Moreover, the processing head 127 is provided with a first holder 133 for supporting a molded electrode 131 and, in the vicinity of the first holder 133 in the processing head 127, a second holder 137 for supporting a hard electrode 135 having exhaustion resistance is provided. The first holder 133 and the second holder 137 are electrically connected to the electric power source 123.

Here, the molded electrode 131 is a molded body molded from any one powder or two or more powders of powder of a cobalt alloy containing chromium, mixed powder of powder of a cobalt alloy containing chromium, powder of a ceramic and powder of an alloy, powder of Ti or powder of TiC by means of compression by pressing; or the molded body subject to a heat treatment by a vacuum furnace or such. Meanwhile, instead of molding by compressing, the molded electrode 131 may be formed by slurry pouring, MIM (Metal Injection Molding), spray forming and such.

Moreover, the ceramic composing the molded electrode 131 includes cBN, TiC, TiAlN, AlN, $TiB_2$, WC, $Cr_3C_2$, SiC, ZrC, VC, $B_4C$, VN, $Si_3N_4$, $ZrO_2$—Y, $Al_2O_3$, $SiO_2$ and such. Meanwhile, the cobalt alloy containing chromium composing the molded electrode 131 preferably contains Cr in 10% or more and does not contain Ni in 20% or more.

On the other hand, the hard electrode 135 is composed of a solid body of graphite, tungsten alloys or copper alloys like as the hard electrode 41 in accordance with the first embodiment.

Figure 15:
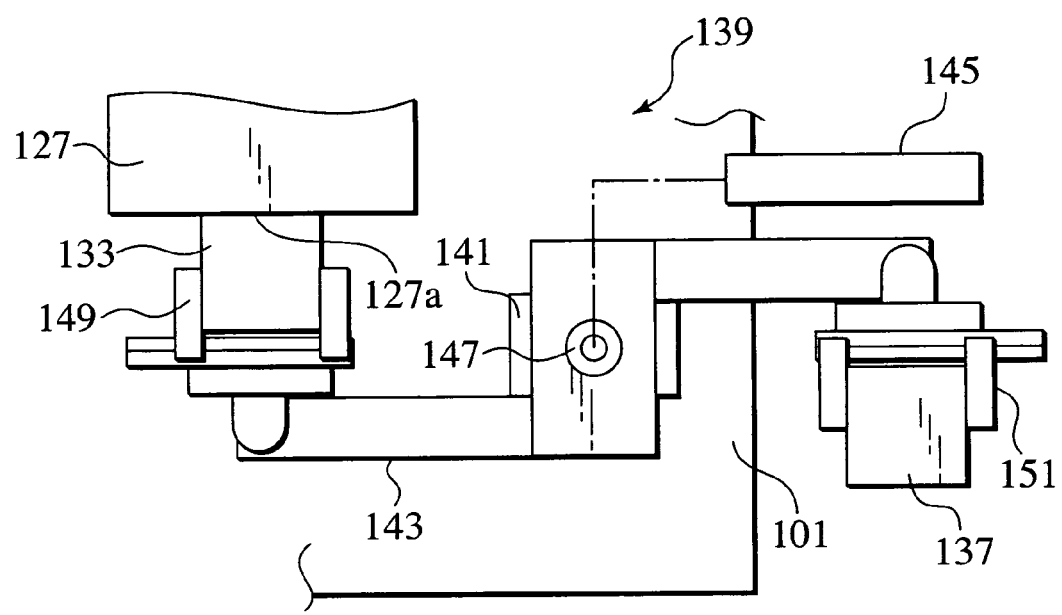
[FIG. 15] A schematic plan view of a replacement unit in accordance with the fourth embodiment.

Meanwhile, instead of that the processing head 127 is provided with the first holder 133 and the second holder 137, a replacement unit 139 as shown in FIG. 15 may be used so as to exchange the first holder 133 and the second holder 137 with respect to the processing head 127.

More specifically, as shown in FIG. 15, the bed 101 is provided with a stay 141 in a standing manner and the stay 141 is provided with an arm 143 to be rotatable around a vertical axis 147 by means of driving a replacement servo-motor 145. Moreover, one end of the arm 143 is provided with a first hand 149 for supporting the first holder 133 by grasping and another end of the arm 143 is provided with a second hand 151 for supporting the second holder 137 by grasping. Meanwhile, the processing head 127 is provided with a grasping mechanism for supporting any holder of the first holder 133 and the second holder 137 by grasping though illustration is omitted.

Therefore, the arm 143 is let to rotate around the vertical axis 147 by means of driving the replacement servo-motor 145 so that the empty first hand 149 approaches the processing head 127. Next, the holder 133 attached to the processing head 127 is grasped by the first hand 149 and then an attaching state by the processing head 127 is canceled. Further, the arm 143 is let to rotate around the vertical axis 147 by means of driving the replacement servo-motor 145 so that the first hand 149 is separated from the processing head 127 as well as the second hand 151 grasping the second holder 137 approaches the processing head 127. Further, the second holder 137 is grasped by the second holder 137 and a grasping state by the second hand 151 is canceled. Thereby, the second holder 137 can be replaced for the first holder 133 and attached to the processing head 127.

Moreover, by operations like as the aforementioned, the first holder 133 can be replaced for the second holder 137 and attached to the processing head 127.

Meanwhile, when rotating the arm 143, the processing head 127 is moved in the Z-axis direction by means of driving the Z-axis servo-motor 127 so that the first holder 133 or the second holder 137 is prevented from interfering the processing head 127.

Figure 16:
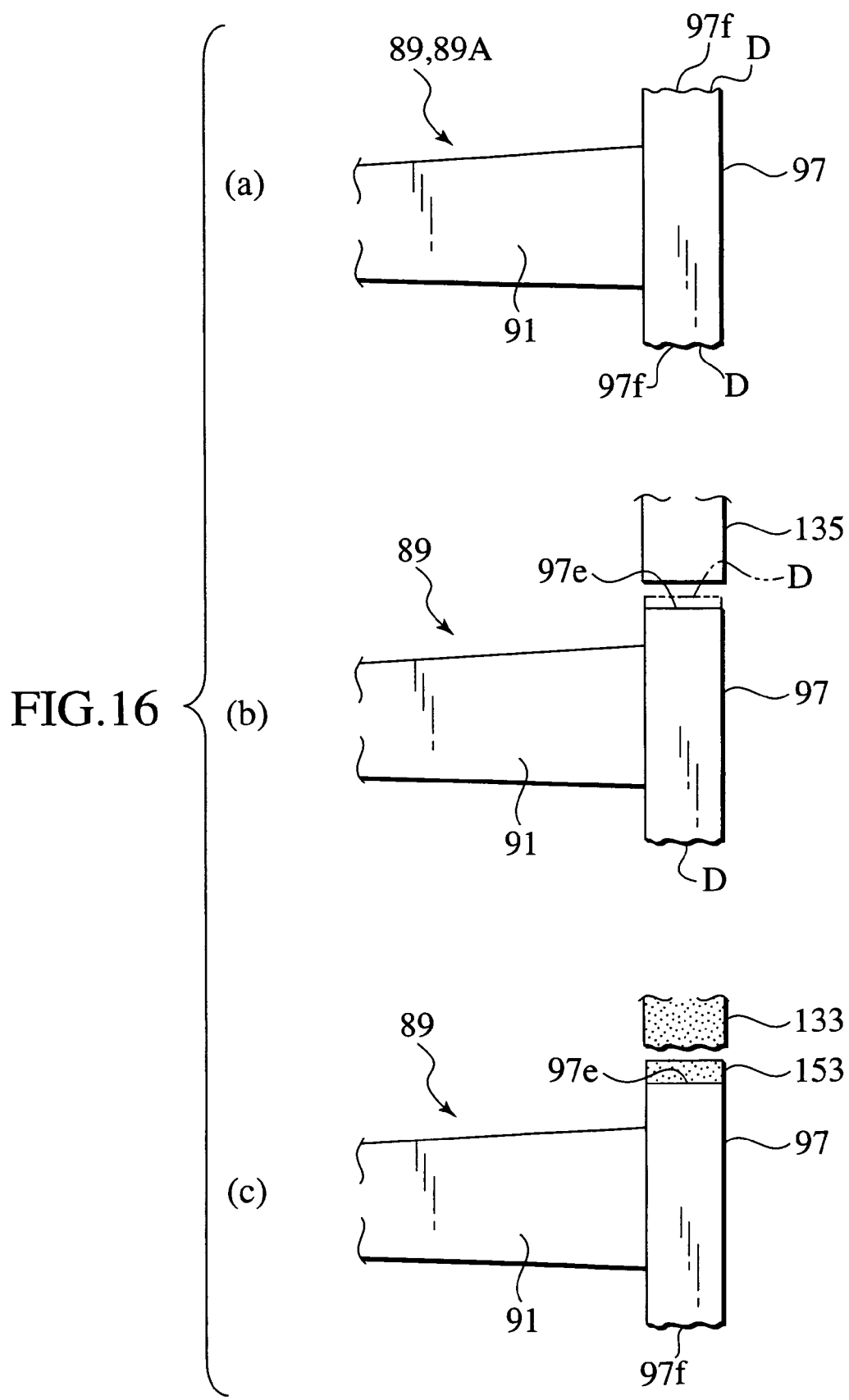
[FIG. 16]
Figure 17:
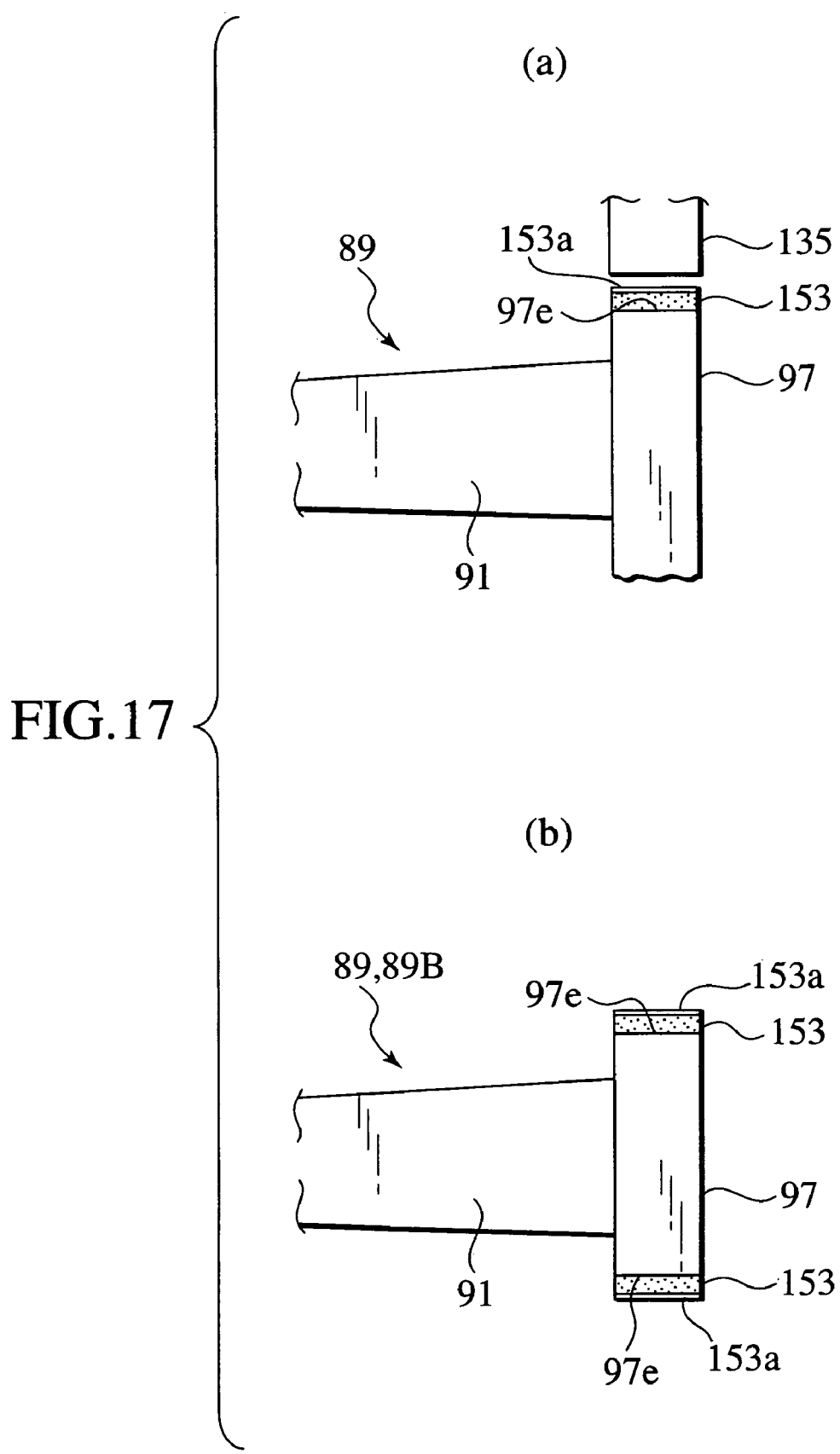
[FIG. 17]

Next, the repair method of the machine component in accordance with the fourth embodiment will be described hereinafter with reference to FIG. 14, FIG. 15, FIG. 16(*a*), FIG. 16(*b*), FIG. 17(*a*) and FIG. 17(*b*).

The repair method of the machine component in accordance with the fourth embodiment is a method for repairing the pair of the abrasion surfaces 97*f* in the turbine rotor blade 89 and provided with a (4-1) removal step, a (4-2) deposition step, a (4-3) finish step and a (4-4) repetition step as shown below.

(4-1) Removal Step

The turbine rotor blade 89 as the machine component is set at the jig 1115 so as to direct one of the abrasion surfaces 97*f* in the turbine rotor blade 89 upward.

Next, by means of driving the X-axis servo-motor 109 and the Y-axis servo-motor 115, the table 113 is moved in the X-axis direction and the Y-axis direction to position the turbine rotor blade 89 so that one of the abrasion surfaces 97*f* is opposed to the hard electrode 135. Meanwhile, there may be a case where the table 113 is only necessary to be moved in the X-axis direction. Moreover, instead of positioning the turbine rotor blade 89, it may be applicable to replace and attach the second holder 137 for the first holder 133 to the processing head 127 by means of the replacement unit 139.

Further, a pulsing electric discharge is generated between one of the abrasion surfaces 97*f* and the hard electrode 135 in an electrically insulating liquid S. Thereby, as shown in FIG. 16(*b*), by means of energy of the electric discharge, a defect D such as a crack occurred to one of the abrasion surfaces 97*f* can be removed. Meanwhile, when generating the pulsing discharge, the hard electrode 135, as being integral with the processing head 127, is reciprocated in the Z-axis direction by a small travel distance by means of driving the Z-axis servo-motor 129. Moreover, in the shroud 97, a portion from which the defect D is removed is referred to as a removed portion 97*e*.

(4-2) Deposition Step

After finishing the (4-1) removal step, by means of driving the X-axis servo-motor 109 and the Y-axis servo-motor 115, the table 113 is moved in the X-axis direction and the Y-axis direction to position the turbine rotor blade 89 so that the removed portion 97*e* of the shroud 97 is opposed to the hard electrode 135. Meanwhile, there may be a case where the table 113 is only necessary to be moved in the X-axis direction. Moreover, instead of positioning the turbine rotor blade 89, it may be applicable to replace and attach the first holder 133 for the second holder 137 to the processing head 127 by means of the replacement unit 139.

Further, a pulsing electric discharge is generated between the removed portion 97e of the shroud 97 and the molded electrode 131 in an electrically insulating liquid S. Thereby, as shown in FIG. 16(c), by means of energy of the electric discharge, a material of the hard electrode 131 or a reaction substance of the material carries out deposition, diffusion and/or welding at the removed portion 97e of the shroud 97 and thereby a porous deposition 153 can be formed. Meanwhile, when generating the pulsing discharge, the molded electrode 131, as being integral with the processing head 127, is reciprocated in the Z-axis direction by a small travel distance by means of a drive of the Z-axis servo-motor 129.

(4-3) Finish Step

After finishing the (4-2) deposition step, by means of driving the X-axis servo-motor 109 and the Y-axis servo-motor 115, the table 113 is moved in the X-axis direction and the Y-axis direction to position the turbine rotor blade 89 so that the deposition 153 is opposed to the hard electrode 135. Meanwhile, there may be a case where the table 113 is only necessary to be moved in the X-axis direction. Moreover, instead of positioning the turbine rotor blade 89, it may be applicable to replace and attach the second holder 137 for the first holder 133 to the processing head 127 by means of the replacement unit 139.

Further, a pulsing electric discharge is generated between the deposition 153 and the hard electrode 135 in an electrically insulating liquid S. Thereby, as shown in FIG. 17(a), by means of energy of the electric discharge, a finish machining to required dimension can be carried out so as to make a thickness of the deposition 153 to be a predetermined thickness with forming a high-density thin film 153a at a surface side of the deposition 153 by melting the surface side of the deposition 153. Meanwhile, when generating the pulsing discharge, the hard electrode 135, as being integral with the processing head 127, is reciprocated in the Z-axis direction by a small travel distance by means of a drive of the Z-axis servo-motor 129.

(4-4) Repetition Step

After finishing the (4-3) finish step, the turbine rotor blade 89 is once detached from the jig 121 and the turbine rotor blade 89 is set at the jig 121 so as to direct the other of the abrasion surfaces 97f in the shroud 97 upward. Then, the steps from the (4-1) removal step to the (4-3) finish step are repeated similarly to the above description and then the repair of the pair of the abrasion surfaces 97f in the shroud 97 is finished.

Meanwhile, the repair method of the machine component in accordance with the aforementioned fourth embodiment may be modified in view of the embodiments as described below.

More specifically, instead of generating a pulsing discharge in the electrically insulating liquid S, a pulsing discharge may be generated in an electrically insulating gas.

Moreover, by using a grinding lathe instead of the electric spark machine 99, removal of the defect D of the pair of the abrasion surfaces 97f in the shroud 97 or the finish machining to required dimension so as to make a thickness of the deposition 153 to be a predetermined thickness may be carried out.

Furthermore, after finishing the (4-3) finish step, a peening step to process a surface side of the deposition 153 with a peening treatment may be added.

Next, operations of the fourth embodiment will be described.

Because the deposition 153 is formed by means of the energy of the electric discharge, a range of the deposition 153 can be limited within a range where the electric discharge is generated and hence it is prevented to generate an excessive deposition at a time of forming the deposition 153. Moreover, for the same reason, a boundary part between the deposition 153 and a base material of the shroud 97 has a structure in which a composition ratio grades and hence the deposition 153 can be firmly combined with the base material of the shroud 97.

Furthermore, in a case where the peening step is added after finishing the (4-3) finish step, residual compression stress can be given to a surface side of the deposition 153 so that a fatigue strength of the deposition 153 can be increased.

Moreover, because the deposition 153 is formed by means of energy of the electric discharge and the energy of the electric discharge locally acts on a prominently small part in the removed part 97e of the shroud 97, temperature rise in the vicinity of the abrasion surfaces 97f of the shroud 97 at a time of forming the deposition 153 is sufficiently prevented.

In accordance with the fourth embodiment as described above, because the range of the deposition 153 can be limited within the range where the electric discharge is generated so that the excessive deposition is prevented from generating at the time of forming the deposition 153, troublesome works after forming the deposition 153 can be reduced and a time required for repairing the pair of the abrasion surfaces 97f in the shroud 97 can be shortened. In particular, because the steps progress from the (4-1) removal step to the (4-4) repetition step by means of the single electric spark machine 99, the time required for the repair can be further shortened.

Moreover, because temperature rise in the vicinity of the abrasion surfaces 97f in the shroud 97 at the time of forming the deposition 153 can be sufficiently suppressed, occurrence of fracture at the abrasion surfaces 97f in the shroud 97 by thermal contraction is prevented so that defective repair of the turbine rotor blade 89 can be avoided as possible.

Furthermore, because the deposition 153 can be firmly combined with the base material of the shroud 97, the deposition 153 become unsusceptible to peeling off from the base material of the shroud 97 and hence quality of the turbine rotor blade 89 after the repair can be stabilized.

Moreover, in the case where the peening step is added after finishing the (4-3) finish step, the fatigue strength of the deposition 153 can be increased and hence the quality of the turbine rotor blade 89 after the repair can be further improved.

Fifth Embodiment

A production method of a restored machine component in accordance with a fifth embodiment will be described hereinafter with reference to FIG. 2, from FIG. 13 through FIG. 15, FIG. 16(a), FIG. 16(b), FIG. 16(c), FIG. 17(a), and FIG. 17(b).

The production method of the restored machine component in accordance with the fifth embodiment is an invention for production of a restored turbine rotor blade 89B as the restored machine component shown in FIG. 17(b) from an original turbine rotor blade 89A as an original machine component shown in FIG. 16(a) and, in other words, an invention taken from the repair method of the machine component in accordance with the fourth embodiment from another viewpoint. Further, the production method of the restored machine component in accordance with the fifth embodiment is also provided with a (5-1) removal step, a (5-2) deposition step, a (5-3) finish step and a (5-4) repetition step like as the repair method of the machine component in accordance with the fourth embodiment. Moreover, in the production method of the restored machine component in accordance with the fifth embodiment, the electric spark machine 99, the molded electrode 131 and the hard electrode 135 as described above are used.

Meanwhile, the restored turbine rotor blade 89B is used in the gas turbine engine 3 shown in FIG. 2 and rotatable around an axial center of the gas turbine engine 3. Moreover, the pair of the abrasion surfaces 97f in the shroud 97 serve as portions to be treated of the original turbine rotor blade 89A.

(5-1) Removal Step

The original turbine rotor blade 89A as the original machine component is set at the jig 121 so as to direct one of the abrasion surfaces 97f in the original turbine rotor blade 89A upward. Next, by moving the table 113 in the X-axis direction and the Y-axis direction, the turbine rotor blade 89A is positioned so that one of the abrasion surfaces 97f is opposed to the hard electrode 135. Further, a pulsing electric discharge is generated between one of the abrasion surfaces 97f and the hard electrode 135 in an electrically insulating liquid S. Thereby, as shown in FIG. 16(b), by means of energy of the electric discharge, a defect D such as a crack occurred to one of the abrasion surfaces 97f can be removed. Meanwhile, in the shroud 97, a portion from which the defect D is removed is referred to as a removed portion 97e.

(5-2) Deposition Step

After finishing the (5-1) removal step, by moving the table 113 in the X-axis direction and the Y-axis direction, the original turbine rotor blade 89A is positioned so that the removed portion 97e of the shroud 97 is opposed to the molded electrode 131. Further, a pulsing electric discharge is generated between the removed portion 97e of the shroud 97 and the molded electrode 131 in an electrically insulating liquid S. Thereby, as shown in FIG. 16(c), by means of energy of the electric discharge, a material of the molded electrode 131 or a reaction substance of the material carries out deposition, diffusion and/or welding at the removed portion 97e of the shroud 97 and thereby a porous deposition 153 can be formed.

(5-3) Finish Step

After finishing the (5-2) deposition step, by moving the table 113 in the X-axis direction and the Y-axis direction, the original turbine rotor blade 89A is positioned so that the deposition 153 is opposed to the hard electrode 135. Further, a pulsing electric discharge is generated between the deposition 153 and the hard electrode 135 in an electrically insulating liquid S. Thereby, as shown in FIG. 17(a), by means of energy of the electric discharge, a finish machining to required dimension can be carried out so as to make a thickness of the deposition 153 to be a predetermined thickness with forming a high-density thin film 153a at a surface side of the deposition 153 by melting the surface side of the deposition 153.

(5-4) Repetition Step

After finishing the (5-3) finish step, the original turbine rotor blade 89A is once detached from the jig 121 and the original turbine rotor blade 89A is set at the jig 121 so as to direct the other of the abrasion surfaces 97f in the shroud 97 upward. Then, the steps from the (5-1) removal step to the (5-3) finish step are repeated similarly to the above description and then the production of the restored turbine rotor blade 89B as the restored machine component is finished.

Meanwhile, the production method of the restored machine component may be modified in view of the embodiments like as the repair method of the machine component in accordance with the first embodiment.

Next, operations of the fifth embodiment will be described.

Because the deposition 153 is formed by means of the energy of the electric discharge, a range of the deposition 153 can be limited within a range where the electric discharge is generated and hence it is prevented to generate an excessive deposition at a time of forming the deposition 153. Moreover, for the same reason, a boundary part between the deposition 153 and a base material of the shroud 97 has a structure in which a composition ratio grades and hence the deposition 153 can be firmly combined with the base material of the shroud 97.

Furthermore, in a case where the peening step is added after finishing the (5-3) finish step, residual compression stress can be given to a surface side of the deposition 153 so that a fatigue strength of the deposition 153 can be increased.

Moreover, because the deposition 153 is formed by means of energy of the electric discharge and the energy of the electric discharge locally acts on a prominently small part in the removed part 97e of the shroud 97, temperature rise in the vicinity of the abrasion surfaces 97f of the shroud 97 at a time of forming the deposition 153 is sufficiently prevented.

In accordance with the fifth embodiment as described above, because the range of the deposition 153 can be limited within the range where the electric discharge is generated so that the excessive deposition is prevented from generating at the time of forming the deposition 153, troublesome works after forming the deposition 153 can be reduced and a time required for production of the restored turbine rotor blade 89B can be shortened. In particular, because the steps progress from the (5-1) removal step to the (5-4) repetition step by means of the single electric spark machine 99, the time required for the production can be further shortened.

Moreover, because temperature rise in the vicinity of the abrasion surfaces 97f in the shroud 97 at the time of forming the deposition 153 can be sufficiently suppressed, occurrence of fracture at the abrasion surfaces 97f in the shroud 97 by thermal contraction is prevented so that defective production of the restored turbine rotor blade 89B can be avoided as possible.

Furthermore, because the deposition 153 can be firmly combined with the base material of the shroud 97, the deposition 153 become unsusceptible to peeling off from the base material of the shroud 97 and hence quality of the restored turbine rotor blade 89B can be stabilized.

Moreover, in the case where the peening step is added after finishing the (5-3) finish step, the fatigue strength of the deposition 153 can be increased and hence the quality of the restored turbine rotor blade 89B can be further improved.

As described above, the invention has been described above by reference to several preferable embodiments, however, the scope and the right of the appended claims should not be limited to these embodiments.

Moreover, the contents of the contents of Japanese Patent Applications No. 2003-167074, No. 2003-167073 and No. 2003-167076, filed with the Japan Patent Office on Jun. 11, 2003, are incorporated herein by reference in their entirety.

The invention claimed is:

1. A method for production of a finished component of a machine from an original component having a defect, comprising:

removing a portion defining the defect to form a recess portion;

depositing a porous deposition via electric spark discharge from a first electrode in an electric spark machine to fill the recess portion with the porous deposition by positioning the recess portion opposed to the first electrode in the electric spark machine; and densifying the porous deposition via electric spark discharge from a second electrode in the electric spark machine by positioning the porous deposition opposed to the second electrode in the electric spark machine to form a high-density thin film.

2. The method of claim 1, wherein the removing is carried out via electric spark discharge from the second electrode in the electric spark machine by positioning the portion defining the defect opposed to the second electrode in the electric spark machine.

3. The method of claim 1, further comprising:
machining the porous deposition such that the porous deposition is shaped to a predetermined dimension before densifying the porous deposition.

4. The method of claim 3, wherein the machining is carried out via electric spark discharge from the second electrode in the electric spark machine by positioning the porous deposition opposed to the second electrode in the electric spark machine.

5. The method of claim 3, further comprising:
depositing a hard thin film via electric spark discharge from an electrode of Si in the electric spark machine on the high-density thin film by positioning the high-density thin film opposed to the electrode of Si in the electric spark machine and wherein the electric spark machine includes a process liquid including alkane hydrocarbons.

6. The method of claim 3, further comprising:
peening the machined deposition.

7. The method of claim 1, further comprising:
depositing a hard thin film via electric spark discharge from a third electrode in the electric spark machine on the high-density thin film by positioning the high-density thin film opposed to the third electrode in the electric spark machine.

8. The method of claim 1, further comprising:
depositing an intermediary porous thin film via electric spark discharge from the first electrode in the electric spark machine on the recess portion by positioning the recess portion opposed to the first electrode in the electric spark machine after removing the portion defining the defect but before depositing the porous deposition; and densifying the intermediary porous thin film via electric spark discharge from the second electrode in the electric spark machine by positioning the intermediary porous thin film opposed to the second electrode in the electric spark machine to form an intermediary high-density thin film.

9. The method of claim 1, wherein the second electrode consists essentially of one selected from the group consisting of graphite, tungsten alloys, and copper alloys.

10. The method of claim 1, wherein the first electrode includes a tip end portion larger than the portion defining the defect by an amount of 0.02 mm or more and 0.3 mm or less.

11. The method of claim 1, further comprising:
forming a main body of the original component by casting or forging.

12. A machine component produced by the method of claim 1.

13. A gas turbine engine comprising a machine component produced by the method of claim 1.

14. A method for production of a finished component of a machine from an original component having a defect, comprising:
removing a portion defining the defect to form a recess portion;

depositing an intermediary porous thin film via electric spark discharge from a first electrode in an electric spark machine on the recess portion by positioning the recess portion opposed to the first electrode in an electric spark machine;

densifying the intermediary porous thin film via electric spark discharge from a second electrode in the electric spark machine by positioning the intermediary porous thin film opposed to the second electrode in the electric spark machine to form an intermediary high-density thin film;

depositing a porous deposition via electric spark discharge from the first electrode in a electric spark machine on the intermediary high-density thin film by positioning the intermediary high-density thin film opposed to the first electrode in the electric spark machine; and depositing a hard thin film via electric spark discharge from an electrode of Si in the electric spark machine on the porous deposition by positioning the porous deposition opposed to the electrode of Si in the electric spark machine, wherein the electric spark machine includes a processing liquid including alkane hydrocarbons.

15. The method of claim 14, wherein the removing is carried out via electric spark discharge from the second electrode in the electric spark machine by positioning the portion defining the defect opposed to the second electrode in the electric spark machine.

16. The method of claim 14, further comprising:
machining the porous deposition such that the porous deposition is shaped to a predetermined dimension.

17. The method of claim 16, further comprising:
densifying the porous deposition via electric spark discharge from the second electrode in the electric spark machine by positioning the porous deposition opposed to the second electrode in the electric spark machine to form high-density thin film.

18. The method of claim 16, further comprising:
peening the machined deposition.

19. An electric spark machine, comprising:
a table configured to be controllably movable in any direction on a plane, the table including a jig configured to support a workpiece;

a processing head configured to be controllably movable with respect to the table in a direction perpendicular to the plane, the processing head including a first holder to support a first deposition electrode and a second holder to support a melting electrode; and an electric power source to supply electricity to the processing head so as to generate electric spark discharge between the workpiece and both the first deposition electrode and the melting electrode, wherein the deposition electrode is a molded electrode configured to deposit a deposit material on the workpiece, and wherein the melting electrode is a solid material electrode such that none of the solid material is deposited on the workpiece.

20. An electric spark machine, comprising:
a table including a jig configured to support a workpiece;
a processing head configured to be controllably movable with respect to the table in both vertical and horizontal directions, the processing head including a first holder to support a first deposition electrode and a second holder to support a melting electrode, the processing head being configured to detachably support the first holder and the second holder;

a replacement unit configured to selectively attach any of a first holder and a second holder to the processing head and exchange the attached holder for the other holder; and an electric power source to supply electricity to the processing head so as to generate electric spark discharge between the workpiece and both the first deposition electrode and the melting electrode, wherein the deposition electrode is a molded electrode configured to deposit a deposit material on the workpiece, and wherein the melting electrode is a solid material electrode such that none of the solid material is deposited on the workpiece.

* * * * *